United States Patent
Yousefpor

(10) Patent No.: US 9,886,141 B2
(45) Date of Patent: Feb. 6, 2018

(54) MUTUAL AND SELF CAPACITANCE TOUCH MEASUREMENTS IN TOUCH PANEL

(71) Applicant: Apple Inc., Cupertino, CA (US)

(72) Inventor: Marduke Yousefpor, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/082,003

(22) Filed: Nov. 15, 2013

(65) Prior Publication Data
US 2015/0049043 A1    Feb. 19, 2015

Related U.S. Application Data

(60) Provisional application No. 61/866,849, filed on Aug. 16, 2013, provisional application No. 61/866,888, filed on Aug. 16, 2013.

(51) Int. Cl.
  *G06F 3/044* (2006.01)
  *G06F 3/041* (2006.01)

(52) U.S. Cl.
  CPC .......... *G06F 3/044* (2013.01); *G06F 3/0416* (2013.01); *G06F 3/0418* (2013.01); *G06F 2203/04111* (2013.01)

(58) Field of Classification Search
  CPC . G06F 2203/04104; G06F 2203/04111; G06F 3/0416; G06F 3/044; G01R 27/2605; H03K 17/962; H03K 2217/960775
  See application file for complete search history.

(56) References Cited

U.S. PATENT DOCUMENTS

| 4,087,625 A | 5/1978 | Dym et al. |
| 4,090,092 A | 5/1978 | Serrano |
| 4,304,976 A | 12/1981 | Gottbreht et al. |
| 4,475,235 A | 10/1984 | Graham |
| 4,550,221 A | 10/1985 | Mabusth |

(Continued)

FOREIGN PATENT DOCUMENTS

| CN | 1246638 A | 3/2000 |
| CN | 1527274 A | 9/2004 |

(Continued)

OTHER PUBLICATIONS

Final Office Action dated Jul. 16, 2014, for U.S. Appl. No. 12/545,604, filed Aug. 21, 2009, 18 pages.

(Continued)

*Primary Examiner* — Liliana Cerullo
(74) *Attorney, Agent, or Firm* — Morrison & Foerster LLP

(57) ABSTRACT

A touch panel capable of measuring both mutual and self capacitance is disclosed. The touch panel can measure self capacitance and mutual capacitance at various electrode patterns and, based on the self capacitance measurements, the mutual capacitance measurements, or both, calculate a touch signal indicative of an object touching or hovering over the touch panel. In some examples, the measurements can also be used to determine a correction factor, indicative of an adverse condition at the touch panel, and the correction factor used to correct the touch signal for the adverse condition. The touch panel can have a row-column electrode pattern or a pixelated electrode pattern.

23 Claims, 23 Drawing Sheets

(56) References Cited

U.S. PATENT DOCUMENTS

| | | |
|---|---|---|
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 * | 3/2009 | Seguine .............. G06K 9/0002 324/663 |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng |
| 8,040,326 B2 | 10/2011 | Hotelling et al. |
| 8,045,783 B2 | 10/2011 | Lee et al. |
| 8,068,097 B2 | 11/2011 | Guanghai |
| 8,120,371 B2 | 2/2012 | Day et al. |
| 8,125,312 B2 | 2/2012 | Orr |
| 8,169,421 B2 | 5/2012 | Wright |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 * | 7/2014 | Hills .................. G01N 27/22 324/658 |
| 8,810,543 B1 | 8/2014 | Kurikawa |
| 8,902,172 B2 | 12/2014 | Peng |
| 8,922,521 B2 | 12/2014 | Hotelling et al. |
| 8,957,874 B2 | 2/2015 | Elias |
| 8,982,096 B2 | 3/2015 | Hong et al. |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,329,723 B2 | 5/2016 | Benbasat et al. |
| 9,372,576 B2 | 6/2016 | Westerman |
| 9,582,131 B2 | 2/2017 | Elias |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0119701 A1 | 6/2004 | Mulligan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |

(56) References Cited

U.S. PATENT DOCUMENTS

| | | |
|---|---|---|
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0054107 A1 | 2/2009 | Feland et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1* | 3/2010 | Yousefpor ................. 345/174 |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0149108 A1 | 6/2010 | Hotelling et al. |
| 2010/0156846 A1 | 6/2010 | Long et al. |
| 2010/0194696 A1 | 8/2010 | Chang et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328228 A1 | 12/2010 | Elias |
| 2010/0328248 A1 | 12/2010 | Mozdzyn |
| 2011/0007020 A1 | 1/2011 | Hong |
| 2011/0025629 A1* | 2/2011 | Grivna et al. ............. 345/173 |
| 2011/0025635 A1 | 2/2011 | Lee |
| 2011/0096016 A1 | 4/2011 | Yilmaz |
| 2011/0134050 A1 | 6/2011 | Harley |
| 2011/0199105 A1 | 8/2011 | Otagaki et al. |
| 2011/0227874 A1 | 9/2011 | Faahraeus et al. |
| 2011/0231139 A1* | 9/2011 | Yokota ................. G06F 1/169 702/104 |
| 2011/0241907 A1 | 10/2011 | Cordeiro |
| 2011/0248949 A1 | 10/2011 | Chang et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050216 A1 | 3/2012 | Kremin et al. |
| 2012/0056662 A1 | 3/2012 | Wilson et al. |
| 2012/0056851 A1* | 3/2012 | Chen ................. G06F 3/0418 345/174 |
| 2012/0092288 A1 | 4/2012 | Wadia |
| 2012/0113047 A1 | 5/2012 | Hanauer |
| 2012/0146726 A1 | 6/2012 | Huang |
| 2012/0146942 A1* | 6/2012 | Kamoshida et al. ......... 345/174 |
| 2012/0154324 A1 | 6/2012 | Wright et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0057511 A1 | 3/2013 | Shepelev et al. |
| 2013/0069911 A1 | 3/2013 | You |
| 2013/0076648 A1 | 3/2013 | Krah et al. |
| 2013/0120303 A1 | 5/2013 | Hong et al. |
| 2013/0127739 A1* | 5/2013 | Guard et al. .................. 345/173 |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1* | 7/2013 | Sobel et al. ................. 345/174 |
| 2013/0176273 A1 | 7/2013 | Li et al. |
| 2013/0215049 A1 | 8/2013 | Lee |
| 2013/0257785 A1* | 10/2013 | Brown et al. ................. 345/174 |
| 2013/0257797 A1* | 10/2013 | Wu et al. ................. 345/174 |
| 2013/0265279 A1 | 10/2013 | Obeidat et al. |
| 2013/0271427 A1 | 10/2013 | Benbasat |
| 2013/0278447 A1* | 10/2013 | Kremin ........................ 341/20 |
| 2013/0278498 A1 | 10/2013 | Jung et al. |
| 2013/0278525 A1 | 10/2013 | Lim |
| 2013/0307821 A1 | 11/2013 | Kogo |
| 2013/0321289 A1 | 12/2013 | Dubery et al. |
| 2013/0342479 A1 | 12/2013 | Pyo et al. |
| 2014/0002406 A1* | 1/2014 | Cormier, Jr. ............. G06F 3/044 345/174 |
| 2014/0009438 A1 | 1/2014 | Liu et al. |
| 2014/0022201 A1* | 1/2014 | Boychuk ................. G06F 3/041 345/174 |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1* | 4/2014 | Chen ................. G06F 3/044 345/174 |
| 2014/0132560 A1 | 5/2014 | Huang et al. |
| 2014/0145997 A1* | 5/2014 | Tiruvuru ................. 345/174 |
| 2014/0168540 A1 | 6/2014 | Wang et al. |
| 2014/0240291 A1* | 8/2014 | Nam ................. G06F 3/0416 345/174 |
| 2014/0247245 A1 | 9/2014 | Lee |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0347574 A1 | 11/2014 | Tung et al. |
| 2014/0362034 A1 | 12/2014 | Mo et al. |
| 2014/0368436 A1 | 12/2014 | Abzarian et al. |
| 2014/0368460 A1* | 12/2014 | Mo et al. ................. 345/174 |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. ................. 324/679 |
| 2015/0002448 A1* | 1/2015 | Brunet ................. G06F 3/0416 345/174 |
| 2015/0002464 A1 | 1/2015 | Nishioka et al. |
| 2015/0015528 A1* | 1/2015 | Vandermeijden ..... G06F 3/0416 345/174 |

(56) References Cited

U.S. PATENT DOCUMENTS

| | | |
|---|---|---|
| 2015/0042607 A1 | 2/2015 | Takanohashi |
| 2015/0049044 A1 | 2/2015 | Yousefpor |
| 2015/0077375 A1 | 3/2015 | Hotelling et al. |
| 2015/0103047 A1* | 4/2015 | Hanauer et al. ............... 345/174 |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0253907 A1 | 9/2015 | Elias |
| 2015/0309610 A1 | 10/2015 | Rabii et al. |
| 2015/0370387 A1 | 12/2015 | Yamaguchi et al. |
| 2015/0378465 A1 | 12/2015 | Shih et al. |
| 2016/0062533 A1 | 3/2016 | O'Connor |
| 2016/0154505 A1 | 6/2016 | Chang |
| 2016/0154529 A1 | 6/2016 | Westerman |
| 2016/0224177 A1 | 8/2016 | Krah |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0357344 A1 | 12/2016 | Benbasat et al. |
| 2017/0090619 A1 | 3/2017 | Yousefpor |
| 2017/0139539 A1 | 5/2017 | Yao et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 103294321 A | 9/2013 |
| CN | 10380981 A | 5/2014 |
| CN | 104020908 A | 9/2014 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 455 264 A3 | 9/2004 |
| EP | 1 573 706 A2 | 9/2005 |
| EP | 1 644 918 A2 | 4/2006 |
| EP | 1 717 677 A2 | 11/2006 |
| EP | 1 717 677 A3 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2450207 A | 12/2008 |
| JP | 2000-163031 A | 6/2000 |
| JP | 2002-342033 A | 11/2002 |
| JP | 2004-503835 A | 2/2004 |
| JP | 2005-0841280 A | 3/2005 |
| JP | 2005-301373 A | 10/2005 |
| JP | 2007-018515 A | 1/2007 |
| JP | 2008-510251 A | 4/2008 |
| JP | 2008-225415 A | 9/2008 |
| KR | 10-2004-0091728 A | 10/2004 |
| KR | 10-2007-0002327 A | 1/2007 |
| KR | 10-2008-0019125 A | 3/2008 |
| KR | 10-2013-0094495 A | 8/2013 |
| KR | 10-2013-0117499 A | 10/2013 |
| KR | 10-2014-0074454 A | 6/2014 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442 A1 | 5/2011 |
| TW | 201401129 A | 1/2014 |
| TW | 201419071 A | 5/2014 |
| WO | WO-99/35633 A2 | 7/1999 |
| WO | WO-99/35633 A3 | 7/1999 |
| WO | WO-0197204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/020305 A3 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/089766 A3 | 8/2007 |
| WO | WO-2007/115032 A2 | 10/2007 |
| WO | WO-2007/146785 A2 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/178920 A1 | 11/2015 |
| WO | WO-2016/048269 A1 | 3/2016 |
| WO | WO-2016/126525 A1 | 8/2016 |
| WO | WO-2016/144437 A1 | 9/2016 |
| WO | WO-2017/058415 A2 | 4/2017 |

OTHER PUBLICATIONS

International Search Report dated Jan. 29, 2015, for PCT Application No. PCT/US2014/047888, filed Jul. 23, 2014, six pages.

Final Office Action dated Feb. 1, 2013, for U.S. Appl. No. 12/642,466, filed Dec. 18, 2009, nine pages.

Final Office Action dated Jan. 27, 2014, for U.S. Appl. No. 12/206,680, filed Sep. 8, 2008, 20 pages.

Final Office Action dated Apr. 23, 2014 for U.S. Appl. No. 12/847,987, filed Jul. 30, 2010, 16 pages.

Final Office Action dated May 9, 2014, for U.S. Appl. No. 12/642,466, filed Dec. 18, 2009, 13 pages.

International Search Report dated May 2, 2011, for PCT Application No. PCT/US2010/058988, filed Dec. 3, 2010, five pages.

Non-Final Office Action dated Aug. 28, 2012, for U.S. Appl. No. 12/642,466, filed Dec. 18, 2009, nine pages.

Non-Final Office Action dated Sep. 6, 2013, for U.S. Appl. No. 12/847,987, filed Jul. 30, 2010, 15 pages.

Non-Final Office Action dated Nov. 8, 2013, for U.S. Appl. No. 12/642,466, filed Dec. 18, 2009, 12 pages.

Non-Final office Action dated Dec. 19, 2013, for U.S. Appl. No. 12/545,604, filed Aug. 21, 2009, 17 pages.

Non-Final Office Action dated Apr. 10, 2014, for U.S. Appl. No. 14/055,717, filed Oct. 16, 2013, 10 pages.

Cassidy, R. (Feb. 23, 2007). "The Tissot T-Touch Watch—A Groundbreaking Timepiece," located at <http://ezinearticles.com/48 The-Tissot-T-Touch-Watch---A-Groundbreaking-Timepiece&id . . . >, last visited Jan. 23, 2009, two pages.

Chinese Search Report dated Jan. 7, 2011, for CN Application No. 2009200081997, filed Apr. 24, 2009, with English Translation, 14 pages.

(56) References Cited

OTHER PUBLICATIONS

Chinese Search Report dated Jan. 10, 2011, for CN Application No. 2008201338142, filed Sep. 27, 2008, with English Translation, 25 pages.
Chinese Search Report completed Jun. 3, 2011, for CN Patent Application No. ZL2009201524013, with English Translation, 20 pages.
European Search Report dated Mar. 19, 2009, for EP Application No. 08017396.6, filed Oct. 8, 2008, seven pages.
Final Office Action dated Jun. 8, 2011, for U.S. Appl. No. 12/038,760, filed Feb. 27, 2008, 20 pages.
Final Office Action dated Dec. 15, 2011, for U.S. Appl. No. 12/333,250, filed Dec. 11, 2008, 12 pages.
Final Office Action dated Jan. 5, 2012, for U.S. Appl. No. 12/206,680, filed Sep. 8, 2008, 15 pages.
Final Office Action dated Jan. 19, 2012, for U.S. Appl. No. 12/110,024, filed Apr. 25, 2008, 12 pages.
Final Office Action dated Aug. 31, 2012, for U.S. Appl. No. 12/110,075, filed Apr. 25, 2008, 15 pages.
Final Office Action dated Dec. 24, 2012, for U.S. Appl. No. 12/110,024, filed Apr. 25, 2008, 21 pages.
Final Office Action dated Jan. 3, 2013, for U.S. Appl. No. 11/818,498, filed Jun. 13, 2007, 17 pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.
Final Office Action dated May 22, 2013, for U.S. Appl. No. 12/206,680, filed Sep. 8, 2008, 16 pages.
Final Office Action dated Jul. 19, 2013, for U.S. Appl. No. 12/545,604, filed Aug. 21, 2009, 17 pages.
Great Britain Search Report dated Jan. 19, 2009, for GB Application No. GB0817242.1, filed Sep. 22, 2008, two pages.
Great Britain Search Report dated Jan. 19, 2010, for GB Application No. GB0817242.1, filed Sep. 22, 2008, two pages.
International Search Report dated Mar. 19, 2009, for PCT Application No. PCT/US2008/078836, filed on Oct. 3, 2008, four pages.
International Search Report dated Jul. 17, 2009, for PCT Application No. PCT/US2009/041460, three pages.
International Search Report dated Aug. 5, 2009, for PCT Application No. PCT/US2009/041465, filed Apr. 22, 2009, four pages.
International Search Report dated Jan. 14, 2011, for PCT Application No. PCT/US2010/029698, filed Apr. 1, 2010, four pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Jul. 8, 2011, for U.S. Appl. No. 12/110,075, filed Apr. 25, 2008, 14 pages.
Non-Final Office Action dated Jul. 11, 2011, for U.S. Appl. No. 12/110,024, filed Apr. 25, 2008, 12 pages.
Non-Final Office Action dated Aug. 17, 2011, for U.S. Appl. No. 12/333,250, filed Dec. 11, 2008, 12 pages.
Non-Final Office Action dated Jan. 25, 2012, for U.S. Appl. No. 12/110,075, filed Apr. 25, 2008, 21 pages.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Jul. 3, 2012, for U.S. Appl. No. 12/110,024, filed Apr. 25, 2008, 19 pages.
Non-Final Office Action dated Sep. 26, 2012, for U.S. Appl. No. 12/206,680, filed Sep. 8, 2008, 14 pages.
Non-Final Office Action dated Nov. 28, 2012, for U.S. Appl. No. 12/494,173, filed Jun. 29, 2009, six pages.
Non-Final Office Action dated Jan. 2, 2013, for U.S. Appl. No. 12/038,760, filed Feb. 27, 2008, 20 pages.
Non-Final office Action dated Jan. 7, 2013, for U.S. Appl. No. 12/545,604, filed Aug. 21, 2009, 12 pages.
Non-Final Office Action dated Mar. 28, 2013, for U.S. Appl. No. 12/110,075 filed Apr. 25, 2008, 14 pages.
Non-Final Office Action dated Mar. 29, 2013 for U.S. Appl. No. 13/737,779, filed Jan. 9, 2013, nine pages.
Non-Final Office Action dated Sep. 30, 2013, for U.S. Appl. No. 12/206,680, filed Sep. 8, 2008, 18 pages.
Notice of Allowance dated Aug. 28, 2012, for U.S. Appl. No. 12/333,250, filed Dec. 11, 2008, nine pages.
Notice of Allowance dated May 23, 2013, for U.S. Appl. No. 12/110,024, filed Apr. 25, 2008, five pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated Nov. 7, 2014, for U.S. Appl. No. 14/055,717, filed Oct. 16, 2013, five pages.
Notice of Allowance dated Oct. 15, 2014, for U.S. Appl. No. 12/494,173, filed Jun. 29, 2009, eight pages.
Non-Final Office Action dated Oct. 27, 2015, for U.S. Appl. No. 14/645,120, filed Mar. 11, 2015, eight pages.
Search report dated Oct. 14, 2015, for TW Application No. 103116003, one page.
Non-Final Office Action dated Oct. 5, 2015, for U.S. Appl. No. 13/899,391, filed May 21, 2013, ten pages.
Final Office Action dated Nov. 12, 2015, for U.S. Appl. No. 14/082,074, filed Nov. 15, 2013, 22 pages.
Non-Final Office Action dated Apr. 10, 2015, for U.S. Appl. No. 14/082,074, filed Nov. 15, 2013, 23 pages.
Chinese Search Report completed Dec. 14, 2011, for CN Patent Application No. ZL201020108330X, filed Feb. 2, 2010, with English Translation, 12 pages.
Chinese Search Report completed May 18, 2015, for CN Patent Application No. 201310042816.6, filed Feb. 2, 2010, two pages.
European Search Report dated Jul. 21, 2010, for EP Patent Application 10151969.2, six pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
Final Office Action dated Jun. 21, 2013, for U.S. Appl. No. 12/545,754, filed Aug. 21, 2009, 6 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.

(56) References Cited

OTHER PUBLICATIONS

Final Office Action dated Jan. 29, 2016, for U.S. Appl. No. 12/642,466, filed Dec. 18, 2009, nine pages.
International Search Report dated Mar. 10, 2010, for PCT Application No. PCT/US2010/22868, filed Feb. 2, 2010, three pages.
International Search Report dated Aug. 6, 2013, for PCT Application No. PCT/US2013/036662, filed Apr. 15, 2013, three pages.
International Search Report dated Sep. 24, 2104, for PCT Application No. PCT/US/2014/39245, eleven pages.
International Search Report dated Dec. 12, 2014, for PCT Application No. PCT/US2014/56795, two pages.
International Search Report dated Jan. 8, 2016, for PCT Application No. PCT/US2015/057644, filed Oct. 27, 2015, four pages.
Malik, S. et al. (2004). "Visual Touchpad: A Two-Handed Gestural Input Device," *Proceedings of the 6<sup>th</sup> International Conference on Multimodal Interfaces*, State College, PA, Oct. 13-15, 2004, *ICMI '04, ACM* pp. 289-296.
Non-Final Office Action dated Mar. 9, 2012, for U.S. Appl. No. 12/238,342, filed Sep. 25, 2008, 26 pgs.
Non-Final Office Action dated May 3, 2012, for U.S. Appl. No. 12/238,333, filed Sep. 25, 2008, 22 pgs.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Jan. 7, 2013, for U.S. Appl. No. 12/238,333, filed Sep. 25, 2008, 20 pgs.
Non-Final Office Action dated Feb. 15, 2013, for U.S. Appl. No. 12/238,342, filed Sep. 25, 2008, 15 pages.
Non-Final Office Action dated Sep. 10, 2013, for U.S. Appl. No. 12/545,754, filed Aug. 21, 2009, six pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Sep. 18, 2014, for U.S. Appl. No. 12/238,333, filed Sep. 25, 2008, 21 pages.
Non-Final Office Action dated Aug. 20, 2015 , for U.S. Appl. No. 14/550,686, filed Nov. 21, 2014, ten pages.
Non-Final Office Action dated Oct. 6, 2015, for U.S. Appl. No. 14/318,157, filed Jun. 27, 2014, seven pages.
Notice of Allowance dated Jun. 10, 2013, for U.S. Appl. No. 12/545,557, filed Aug. 21, 2009, 9 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, ten pages.
Notice of Allowance dated Mar. 16, 2015, for U.S. Appl. No. 14/312,489, filed Jun. 23, 2014, eight pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.].
Search Report dated Nov. 12, 2015, for ROC (Taiwan) Patent Application No. 103105965, with English translation, two pages.
Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.
Yang, J-H. et al. (Jul. 2013). "A Noise-Immune High-Speed Readout Circuit for In-Cell Touch Screen Panels," *IEEE Transactions on Circuits and Systems—1: Regular Papers* 60(7):1800-1809.
Non-Final Office Action dated May 4, 2015, for U.S. Appl. No. 12/642,466, filed Dec. 18, 2009, nine pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Non-Final Office Action dated Jun. 1, 2016, for U.S. Appl. No. 14/615,186, filed Feb. 5, 2015, eight pages.
TW Search Report dated May 4, 2016, for TW Application No. 104115152, one page.
Final Office Action dated Sep. 29, 2016, for U.S. Appl. No. 14/558,529, filed Dec. 2, 2014, 22 pages.
Non-Final Office Action dated Dec. 14, 2016, for U.S. Appl. No. 14/550,686, filed Nov. 21, 2014, eight pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Notice of Allowance dated Dec. 2, 2016, for U.S. Appl. No. 14/615,186, filed Feb. 5, 2015, seven pages.
European Search Report dated Jul. 27, 2017, for EP Application No. 14902458.0, four pages.
Final Office Action dated Jul. 26, 2017, for U.S. Appl. No. 14/318,157, filed Jun. 27, 2014, 10 pages.
Final Office Action dated Aug. 10, 2017, for U.S. Appl. No. 14/645,120, filed Mar. 11, 2015, twelve pages.
Non-Final Office Action dated Apr. 7, 2017, for U.S. Appl. No. 15/144,706, filed May 2, 2016, eight pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.
Final Office Action dated Apr. 8, 2016, for U.S. Appl. No. 13/899,391, filed May 21, 2013, ten pages.
Non-Final Office Action dated Apr. 14, 2016, for U.S. Appl. No. 14/558,529, filed Dec. 2, 2014, twenty pages.

\* cited by examiner

MUTUAL AND SELF CAPACITANCE TOUCH MEASUREMENTS IN TOUCH PANEL

FIELD

This relates generally to capacitance touch panels and, more specifically, to a touch panel capable of measuring both mutual and self capacitance.

BACKGROUND

Many types of input devices are presently available for performing operations in a computing system, such as buttons or keys, mice, trackballs, joysticks, touch panels, touch screens and the like. Touch sensitive devices, and touch screens in particular, are quite popular because of their ease and versatility of operation as well as their affordable prices. A touch sensitive device can include a touch panel, which can be a clear panel with a touch sensitive surface, and a display device such as a liquid crystal display (LCD) that can be positioned partially or fully behind the panel so that the touch sensitive surface can cover at least a portion of the viewable area of the display device. The touch sensitive device can allow a user to perform various functions by touching or hovering over the touch panel using a finger, stylus or other object at a location often dictated by a user interface (UI) being displayed by the display device. In general, the touch sensitive device can recognize a touch or hover event and the position of the event on the touch panel, and the computing system can then interpret the event in accordance with the display appearing at the time of the event, and thereafter can perform one or more actions based on the event.

In some instances, it can be difficult to distinguish between a touch event and a hover event or between an actual event and a false event. This difficulty can be exacerbated when there are adverse conditions at the touch panel, such as poor grounding of the touching or hovering object, the presence of water droplets on the touch panel, or noise introduced into the touch panel.

SUMMARY

This relates to measuring both mutual and self capacitance in a touch panel. A method can include measuring self capacitance and mutual capacitance at various electrode patterns of the touch panel and, based on the self capacitance measurements, the mutual capacitance measurements, or both, calculating a touch signal indicative of an object touching or hovering over the touch panel. In some examples, the touch panel can be a row-column electrode pattern. In some examples, the touch panel can have a pixelated electrode pattern. In some examples, the self capacitance measurements, the mutual capacitance measurements, or both can be used to determine a correction factor, indicative of an adverse condition at the touch panel, and the correction factor used to correct the touch signal for the adverse condition. By measuring both mutual and self capacitance, the touch panel can advantageously provide more accurate and faster touch signal detection, as well as power savings, and more robustly adapt to various adverse conditions.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to measuring both mutual and self capacitance in a touch panel. A method can include measuring self capacitance and mutual capacitance at various electrode patterns of the touch panel and, based on the self capacitance measurements, the mutual capacitance measurements, or both, calculating a touch signal indicative of an object touching or hovering over the touch panel. In some examples, the measurements can be used to determine a correction factor, indicative of an adverse condition at the touch panel, and the correction factor used to correct the touch signal for the adverse condition. By measuring both mutual and self capacitance, the touch panel can advantageously provide more accurate and faster touch signal detection, as well as power savings, and more robustly adapt to various adverse conditions.

The ability to measure both mutual and self capacitance can advantageously provide more accurate and faster touch signal detection, as well as power savings, by not having to repeat ambiguous or poor signals. Additionally, a touch panel can more robustly adapt to various adverse conditions.

Figure 1:
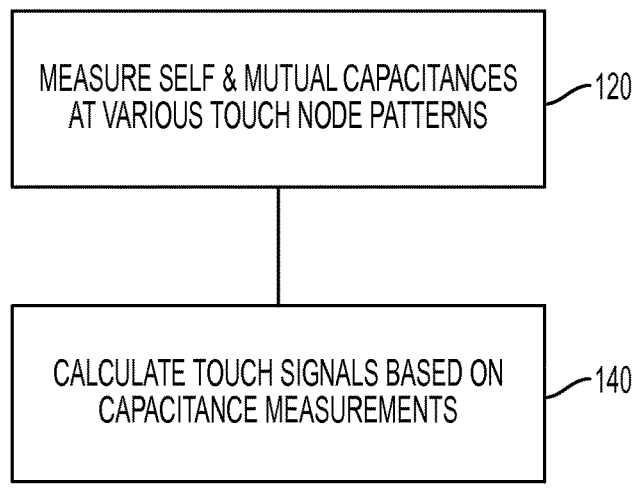
FIG. 1 illustrates an exemplary method for measuring mutual and self capacitance in a touch panel according to various examples.

FIG. 1 illustrates an exemplary method for measuring both mutual and self capacitance in a touch panel of a touch sensitive device. In the example of FIG. 1, self capacitance and mutual capacitance at various electrode patterns of the panel can be measured (120). Based on the self capacitance measurements, the mutual capacitance measurements, or both, a touch signal can be calculated indicative of a proximate object (i.e., a touching or hovering object) (140). Several variations of this method will be described in more detail below.

In some examples, the self and mutual capacitance measurements can be indicative of an adverse condition at the touch panel, e.g., a poorly grounded object touching or hovering over the panel, water droplets on the panel, or noise introduced into the panel. Accordingly, the measurements can also be used to determine a correction factor for the touch signal and the correction factor used to calculate the touch signal corrected for the adverse condition.

Figure 2:
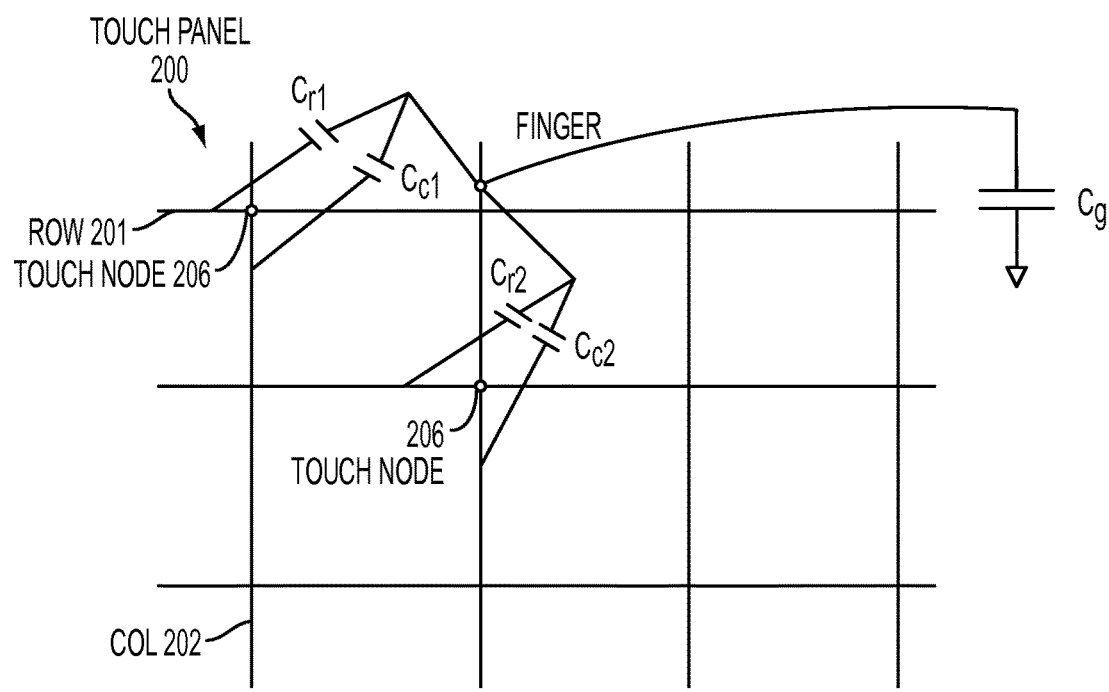
FIG. 2 illustrates an exemplary touch panel with a row-column electrode configuration according to various examples.

One type of touch panel can have a row-column electrode pattern. FIG. 2 illustrates an exemplary row-column electrode touch panel. In the example of FIG. 2, touch panel 200 can include an array of touch nodes 206 formed at the crossing points of row conductive traces 201 and column conductive traces 202, although it should be understood that other node configurations can be employed. Each touch node 206 can have an associated mutual capacitance Cm formed between the crossing row traces 201 and column traces 202.

When a well-grounded user's finger (or other object) touches or hovers over the panel 200, the finger can cause the capacitance Cm to reduce by an amount ΔCm at the touch location. This capacitance change ΔCm can be caused by charge or current from a stimulated row trace 201 being shunted through the touching (or hovering) finger to ground rather than being coupled to the crossing column trace 202 at the touch location. Touch signals representative of the capacitance change ΔCm can be transmitted by the column traces 202 to sense circuitry (not shown) for processing. The touch signals can indicate the touch node 206 where the touch occurred and the amount of touch that occurred at that node location.

However, as illustrated in FIG. 2, when a poorly grounded user's finger (or other object) touches or hovers over the panel 200, the finger can form one or more secondary capacitive paths back into the panel rather than to ground. In this example, the finger can be within detectable distance of two touch nodes 206, one node formed by the first row r1 and first column c1 and the other node formed by the second row r2 and second column c2. A finger capacitance Cr1 to the row trace r1, a finger capacitance Cc1 to the column trace c1, and a finger capacitance Cg to user ground can form one secondary path for coupling charge from stimulated row trace r1 back into the panel via column trace c1. Similarly, a finger capacitance Cr2 to the row trace r2, a finger capacitance Cc2 to the column trace c2, and a finger capacitance Cg to user ground can form another secondary path. As a result, instead of the capacitance Cm of the touch node at the touch location being reduced by ΔCm, Cm may only be reduced by (ΔCm−Cneg), where Cneg can represent a so-called "negative capacitance" resulting from the charge coupled into the crossing column trace due to the finger's poor grounding. The touch signals can still generally indicate the touch node 206 where the touch occurred, but with an indication of a lesser amount of touch than actually occurred.

Figure 3:
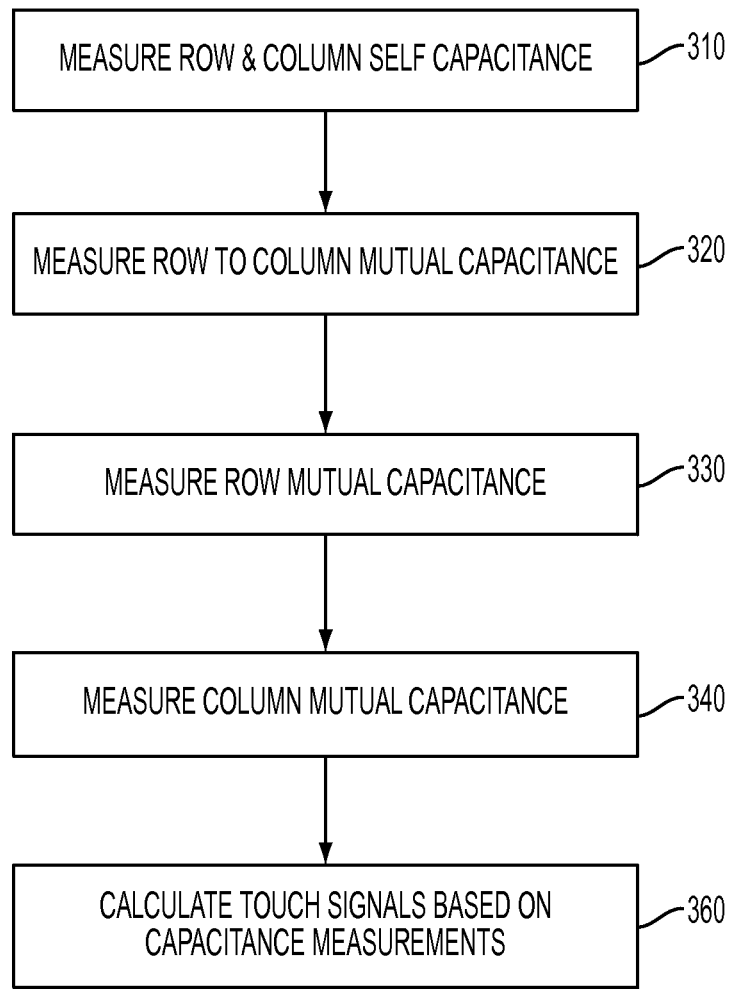
FIG. 3 illustrates an exemplary method for measuring mutual and self capacitance from multiple row-column electrode patterns in a touch panel according to various examples.
Figure 5:
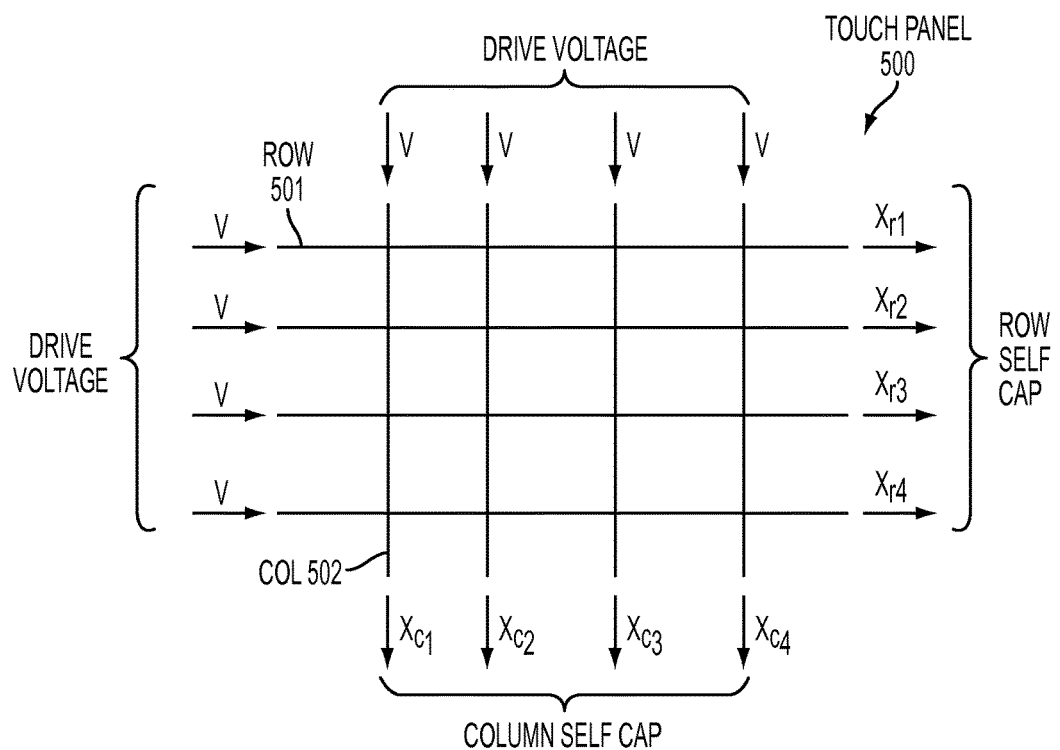

Accordingly, detecting the negative capacitance and correcting the touch signals for the negative capacitance, using mutual and/or self capacitances measurements, can improve touch detection of the touch panel in poor user grounding conditions. Similar improvements can be realized for other adverse conditions. OK FIG. 3 illustrates an exemplary method for measuring both mutual and self capacitance in the row-column touch panel of FIG. 2. In the example of FIG. 3, a touch panel can capture self and mutual capacitances at various row-column electrode patterns in the panel and calculate a touch signal using the captured measurements. Accordingly, the panel can measure self capacitances Xr, Xc of the row and column traces, respectively, in the panel (310). FIG. 5 illustrates a touch panel 500 having an exemplary row-column electrode pattern measuring row and column self capacitances, using a boot strap operation. In the example of FIG. 5, row traces 501 and column traces 502 can be stimulated simultaneously by stimulation signals V provided by drive circuitry (not shown) that can include an alternating current (AC) waveform and can transmit self capacitances Xr, Xc to sense circuitry (not shown) that can include a sense amplifier for column sense trace 502. Accordingly, the self capacitances Xr, Xc can be measured in a single operation.

In some examples, a touch panel can include a grounding plate underlying the row and column traces and can have gaps between the traces, such that portions of the plate are exposed to a finger proximate (i.e., touching or hovering over) to the traces. A poorly grounded finger and the exposed plate can form a secondary capacitive path that can affect a touch signal. Accordingly, while stimulating the row and column traces, the plate can be stimulated by the stimulation signals V as well so that the row and column self capacitance measurements include the grounding conditions associated with the plate.

Figure 4:
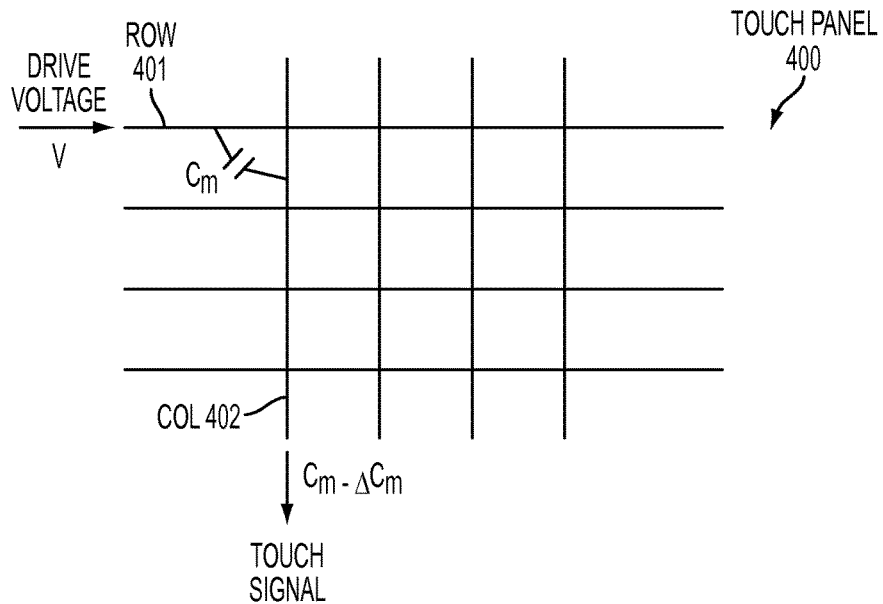
FIGS. 4 through 7 (including FIGS. 6A and 6B) illustrate exemplary row-column electrode patterns in a touch panel for measuring mutual and self capacitance according to various examples.

Referring again to FIG. 3, after measuring the self capacitances, the panel can measure row-to-column mutual capacitance Cm (or Yrc) of row and column traces in the panel (320). FIG. 4 illustrates an exemplary row-column electrode pattern measuring row-to-column mutual capacitances. In the example of FIG. 4, touch panel 400 can include row trace 401 functioning as a drive line and column trace 402 functioning as a sense line, where the row and column traces can form mutual capacitance Cm at their crossing. The row drive trace 401 can be stimulated by stimulation signals V provided by drive circuitry (not shown) and the column sense trace 402 can transmit touch signal (Cm−ΔCm), indicative of a touch at the panel 400, to sense circuitry (not shown).

Figure 6A:
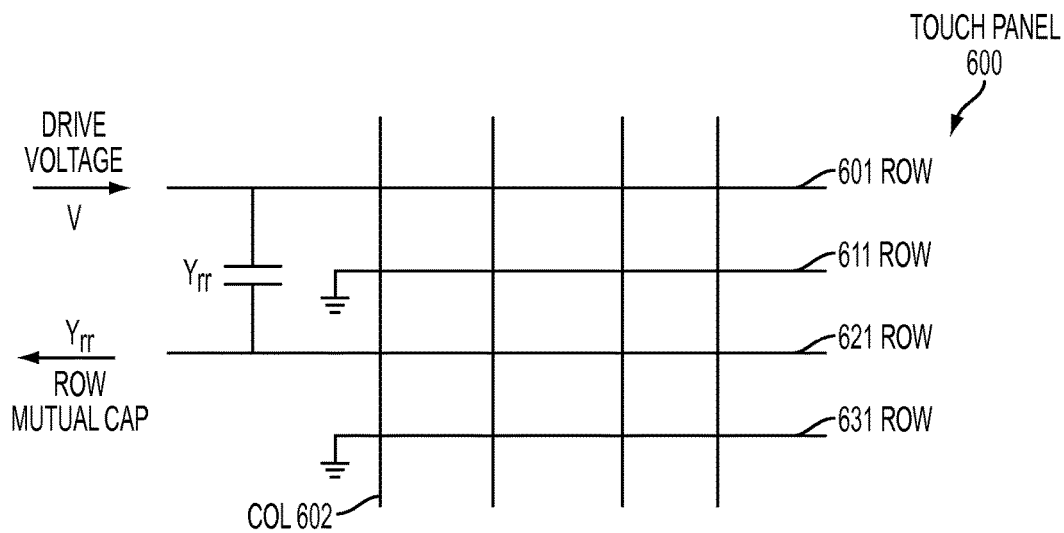
Figure 6B:
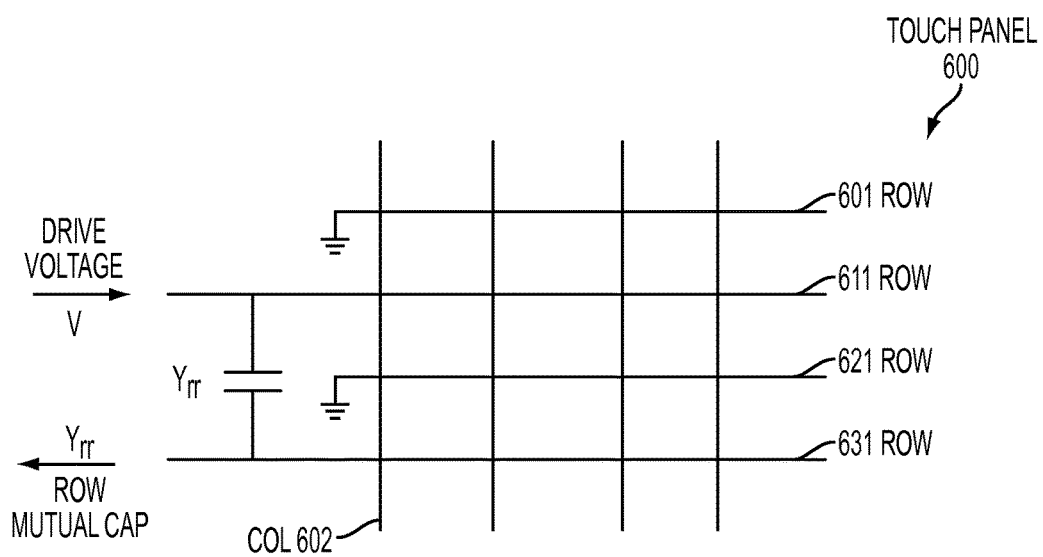

Referring again to FIG. 3, after measuring the row-to-column mutual capacitances, the panel can measure row-to-row mutual capacitances Yrr of row traces in the panel (330). FIGS. 6A and 6B illustrate exemplary row-row electrode patterns measuring row-to-row mutual capacitances. As shown in FIGS. 6A and 6B, touch panel 600 may include columns 602 and rows (e.g. rows 601, 611, 621 and 631 In the example of FIG. 6A, touch panel 600 can be configured to form a row-row electrode pattern of the first row 601 as a drive trace, the second row 611 as a ground trace, the third row 621 as a sense trace, the fourth row 631 as another ground trace, and the pattern repeated for the remaining rows. The row drive and sense traces 601, 621 can form mutual capacitance Yrr therebetween. The row drive trace 601 can be stimulated by stimulation signals V provided by drive circuitry (not shown) and the row sense trace 621 can transmit mutual capacitance Yrr to sense circuitry (not shown). To ensure that mutual capacitances are measured for all the rows, the panel 600 can be configured to form another row-row electrode pattern of the first row 601 as a ground trace, the second row 611 as a drive trace, the third row 621 as another ground trace, the fourth row 631 as a sense trace, and the pattern repeated for the remaining rows, as illustrated in FIG. 6B. Like the previous pattern, the row drive trace 611 can be stimulated and the row sense trace 631 can transmit the mutual capacitance Yrr. Accordingly, the mutual capacitances Yrr can be measured in a first operation at one row-row electrode pattern, followed by a second operation at the other row-row electrode pattern. In some examples, the row drive traces can be stimulated one at a time. In some examples, multiple row drive traces can be stimulated at the same time.

Figure 7:
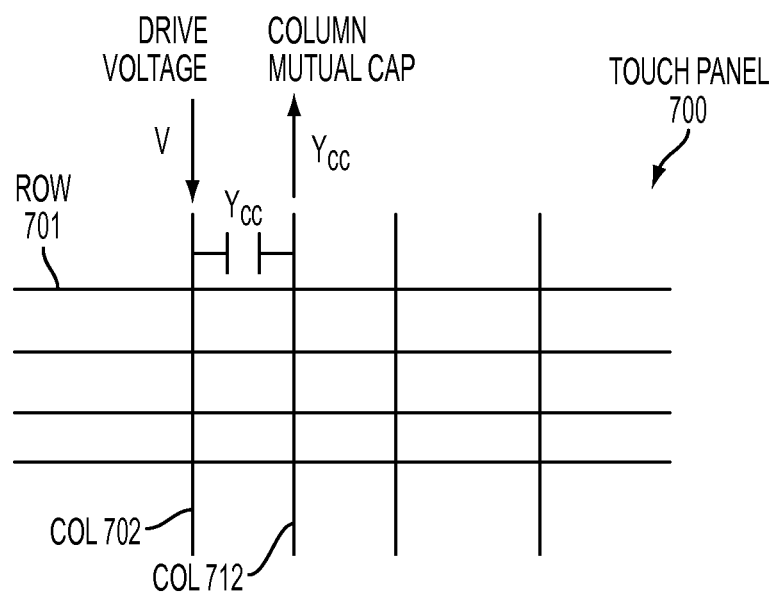

Referring again to FIG. 3, after measuring the row-to-row mutual capacitances, the panel can measure column-to-column mutual capacitances Ycc of column traces in the panel (340). FIG. 7 illustrates an exemplary column-column electrode pattern measuring column-to-column mutual capacitance. In the example of FIG. 7, touch panel 700 can be configured to form a column-column electrode pattern of the first column 702 as a drive trace, the second column 712 as a sense trace, and the pattern repeated for the remaining columns. The column drive and sense traces 702, 712 can form mutual capacitance Ycc therebetween. The column drive trace 702 can be stimulated by stimulation signals V provided by drive circuitry (not shown) and the column sense trace 712 can transmit mutual capacitance Ycc to sense circuitry (not shown). Accordingly, the mutual capacitances Ycc can be measured in one operation at the column-column electrode pattern. In some examples, the column drive traces can be stimulated one at a time. In some examples, multiple column drive traces can be stimulated as the same time.

As illustrated in FIG. 6, a row trace can be configured as a ground trace to separate the row drive and sense traces. This can be done when the traces are very close together so as to avoid strong mutual capacitances between adjacent traces affected by a finger proximate thereto, which can adversely affect the trace-to-trace mutual capacitance measurements. Conversely, as illustrated in FIG. 7, a column ground trace can be omitted. This can be done when the traces are far enough apart so that weaker mutual capacitances between adjacent traces cannot be affected by a finger proximate thereto, so as to not adversely affect the trace-to-trace mutual capacitance measurements. Accordingly, in alternate examples, the row-row electrode pattern can include the first row as a drive trace, the second row as a sense trace, and the pattern repeated for the remaining rows, as illustrated in FIG. 7. Similarly, in alternate examples, one column-column electrode pattern can include the first column as a drive trace, the second column as a ground trace, the third column as a sense trace, the fourth column as another ground trace, and the pattern repeated for the remaining columns, as illustrated in FIG. 6A. Another column-column electrode pattern can include the first column as a ground trace, the second column as a drive trace, the third column as another ground trace, the fourth column as a sense trace, and the pattern repeated for the remaining columns, as illustrated in FIG. 6B. These and other example patterns are possible according to the panel specifications.

Referring again to FIG. 3, after measuring the column-to-column mutual capacitances, a touch signal can be calculated based on the row and column self capacitances, the row-to-column mutual capacitances, the column-to-column mutual capacitances, and the row-to-row mutual capacitances (360).

In alternate examples, the row-to-row mutual capacitance and column-to-column mutual capacitance measurements. Accordingly, the touch signal can be calculated based on the row and column self capacitances and the row-to-column mutual capacitances.

In some examples, a correction factor K, indicative of an adverse condition at the panel, can be determined based on the self and mutual capacitance measurements and the correction factor can be used to calculate the touch signal corrected for the adverse condition (360). Equation (1) can be used to calculate the corrected touch signal.

$$\Delta Cm_{ij,actual} = \Delta Cm_{ij} + K \cdot Xr_i Xc_j \qquad (1)$$

where $\Delta Cm_{ij,actual}$=the corrected touch signal of the touch node at row trace i and column trace j, $\Delta Cm_{ij}$=the measured touch signal of the touch node at row trace i and column trace j, $Xr_i$=self capacitance measurement of row trace i, $Xc_j$=self capacitance measurement of column trace j, and $K=f(Xr_i, Xc_j, Yr_ir_k, Yc_jc_l)$, where K is a function of $Xr_i$, $Xc_j$, $Yr_ir_k$ (mutual capacitance measurement of row trace i to row trace k), and $Yc_jc_l$ (mutual capacitance measurement of column trace j to column trace l), and indicative of the adverse condition. In some examples, K can be determined through empirical analysis of the capacitance measurements.

In alternate examples, K can be determined from an estimate based on negative capacitance measurements, where $K=f(\Delta Cm_{ij}<0)$, such that row-to-row and column-to-column mutual capacitance measurements can be omitted.

Figure 8A:
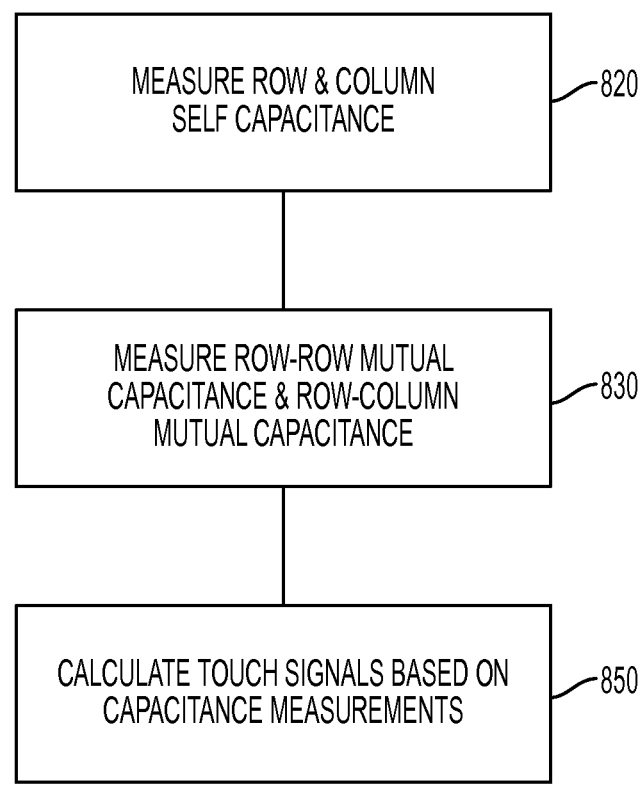
FIG. 8A illustrates another exemplary method for measuring mutual and self capacitance from multiple row-column electrode patterns in a touch panel according to various examples.

FIG. 8A illustrates another exemplary method for measuring both mutual and self capacitance in the row-column touch panel of FIG. 2. The FIG. 8B method is similar to the FIG. 3 method, but can omit the measuring of the column-to-column mutual capacitance and can measure the row-to-column mutual capacitance simultaneously with the row-to-row mutual capacitance. In the example of FIG. 8A, a touch panel can simultaneously measure row and column self capacitance, as illustrated in FIG. 5 (820). The panel can measure row-to-row mutual capacitance, as illustrated in FIG. 6, and additionally measure row-to-column mutual capacitance at the same time, as illustrated in FIG. 4 (830). A touch signal can be calculated based on the row and column self capacitances, the row-to-column mutual capacitances, and the row-to-row mutual capacitances (850).

In some examples, a correction factor K, indicative of an adverse condition, can be determined based on the self and mutual capacitance measurements such that $K=f(Xr_i, Xc_j, Yr_ir_k)$, and used to calculate a touch signal corrected for the adverse condition. In some examples, this method can decrease the measurement time by omitting the separate column-to-column mutual capacitance operation. Reducing measurement time can be desirable in a touch sensitive device that includes a display device along with the touch panel, because the shorter measurement time can occur during the display's blanking (or updating) period, thereby avoiding interference from the display on the measurements.

Figure 8B:
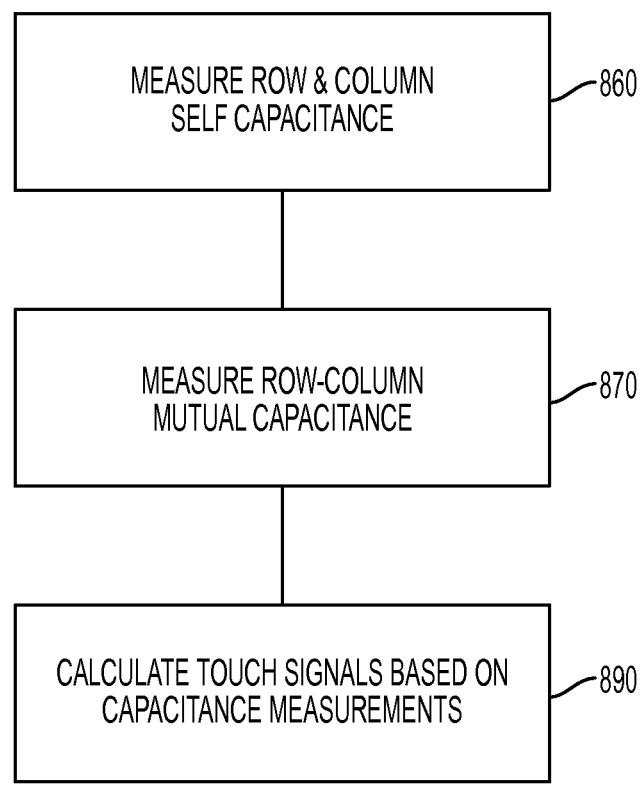
FIG. 8B illustrates still another exemplary method for measuring mutual and self capacitance from multiple row-column electrode patterns in a touch panel according to various examples.

FIG. 8B illustrates another exemplary method for measuring both mutual and self capacitance in the row-column touch panel of FIG. 2. The FIG. 8B method is similar to the FIG. 8A method, but can omit the measuring of the row-to-row mutual capacitance. In the example of FIG. 8B, a touch panel can simultaneously measure row and column self capacitance, as illustrated in FIG. 5 (860). The panel can measure row-to-column mutual capacitance, as illustrated in FIG. 4 (870). A touch signal can be calculated based on the row and column self capacitances and the row-to-column mutual capacitances (890).

In some examples, a correction factor K, indicative of an adverse condition, can be determined based on the row and col mutual capacitance measurements and used to calculate a touch signal corrected for the adverse condition (890). Here, $K=f(\Delta Cm_{ij}<0)$.

In an alternate method, rather than using the correction factor to calculate a touch signal (890), the mutual capacitance measurement Yricj (mutual capacitance measurement of row trace i to column trace j, or Cmij) can be used to determine the touch signal unless the $\Delta Cm_{ij}$ measurement indicates a negative capacitance. In which case, the self capacitance measurements Xr, Xc can be used to determine the touch signal.

It should be understood that the row-column electrode patterns are not limited to those illustrated in FIGS. 4 through 7, but can include other or additional patterns suitable for measuring self and mutual capacitance of row and column traces in the touch panel. For example the row-column electrode pattern can be configured to include a first row trace as a drive trace, a second row trace as a ground trace, followed by multiple row traces as sense traces to form mutual capacitances with the first row trace, followed by another row trace as another ground trace, and the pattern repeated for the remaining row traces. In an alternate example, the row-column electrode pattern can be configured to include a first row trace as a drive trace, followed by multiple row traces as sense traces to form mutual capacitances with the first row trace, and the pattern repeated for the remaining row traces. Similar patterns can be configured for the column traces.

Figure 9:
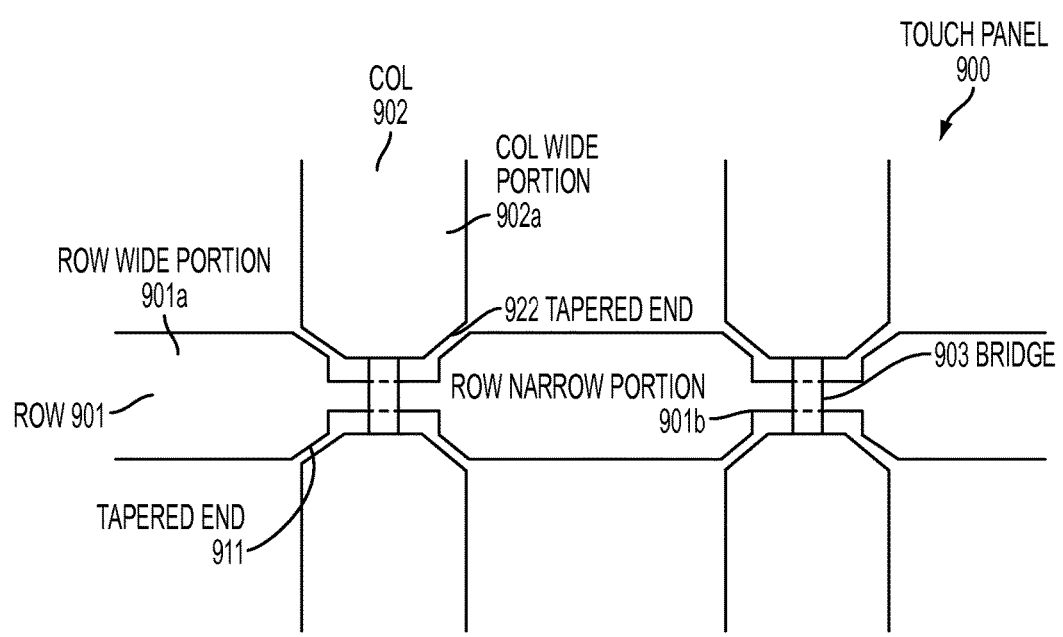
FIG. 9 illustrates an exemplary row-column electrode structure in a touch panel on which to measure mutual and self capacitances according to various examples.

In addition to applying a correction factor to a touch signal to correct for an adverse condition at a touch panel, the structure of the row and column traces can be designed so as to mitigate an adverse condition. FIG. 9 illustrates an exemplary row-column electrode structure that can be used. In the example of FIG. 9, touch panel 900 can include row traces 901 and column traces 902. Row trace 901 can form a single trace with alternate wider portions 901a having tapered ends 911 and narrower portions 901b at the tapered ends. Column trace 902 can form separate wider portions 902a having tapered ends 922 that are connected together by conductive bridge 903. The bridge 903 of the column trace 902 can cross the narrower portion 901b of the row trace 901. This structure can advantageously maximize the row-to-column mutual capacitance forming touch signals, while minimizing trace area that can be affected by noise introduced by the stimulation signals V, row-to-row and/or column-to-column mutual capacitance that can negatively affect touch signals, and row and column to ground capacitance that can negatively affect touch signals.

In alternate examples, the row traces 901 can have separate wider portions and conductive bridges that connect together the wider portions, like the column traces 902. In other alternate examples, the column traces 902 can form single traces with alternate wider and narrower portions.

Water can be introduced into a row-column touch panel in a variety of ways, e.g., humidity, perspiration, or a wet touching object, and can cause problems for the panel because the water can couple with any row or column in the panel to form a mutual capacitance, making it difficult to distinguish between the water and a touch or hover event. Moreover, the water can create a negative capacitance in the panel, particularly, when it shares row and/or column traces with the touch or hover event.

Figure 31:
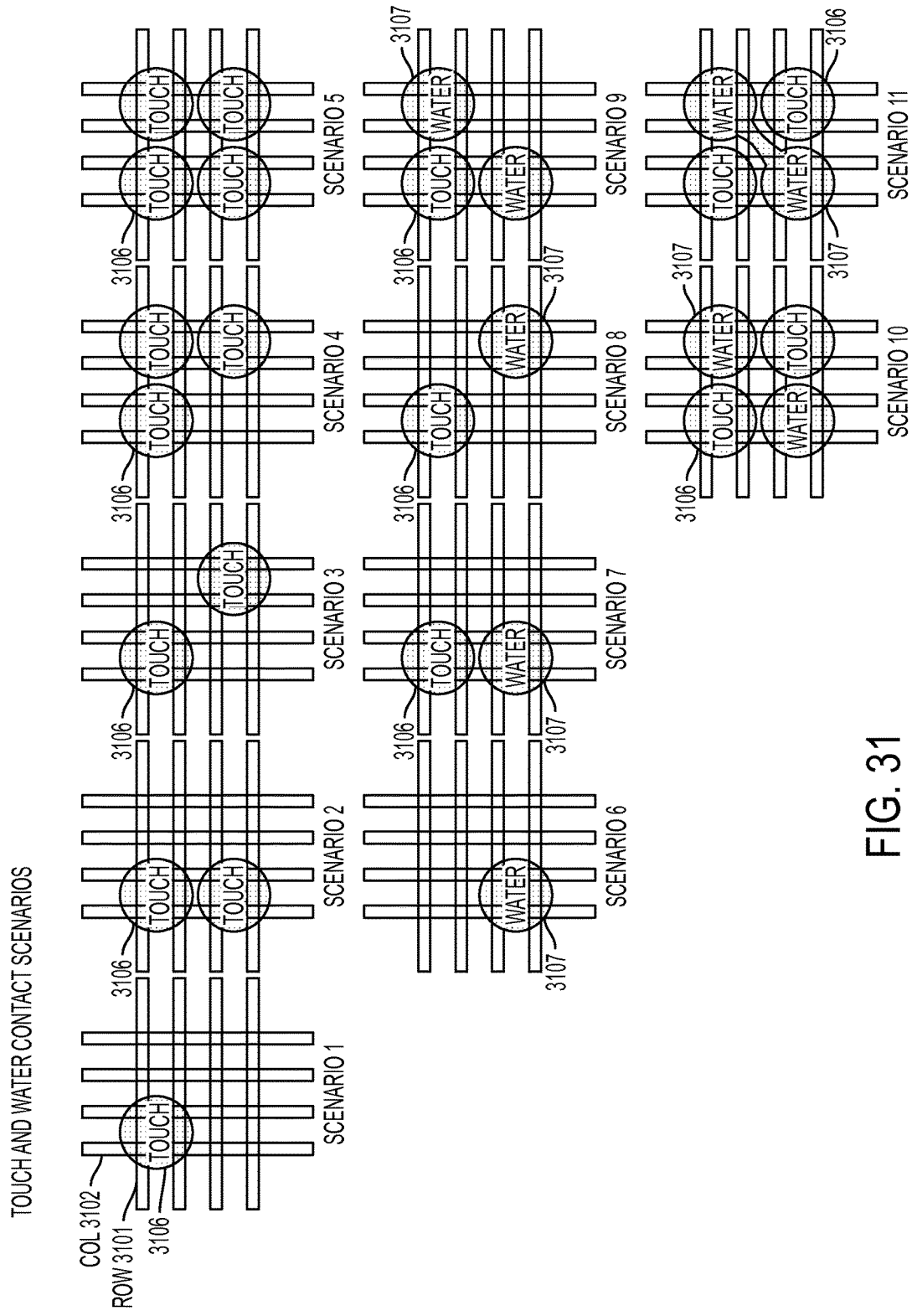
FIG. 31 illustrates exemplary touch and water scenarios on a touch panel that can affect touch signals according to various examples.

FIG. 31 illustrates exemplary water and touch scenarios that a row-column touch panel can encounter which can cause the difficulties described above. In the example of FIG. 31, scenario 1 illustrates a single touch 3106 without water at the row traces 3101 and column traces 3102 of the panel. Scenarios 2 through 5 illustrate multiple touches 3106 without water at various locations on the panel. Scenario 6 illustrates a water droplet 3107 without a touch on the panel. Scenarios 7 through 11 illustrate one or more water droplets 3107 and one or more touches 3106 at various locations on the panel at the same time, where the water and the touch share row and/or column traces. Scenario 11 illustrates the water droplets 3107 converging to create a larger water blob on the panel. It should be understood that these scenarios are for exemplary purposes only, as other scenarios are also possible.

The methods of FIGS. 3 and 8, the patterns of FIGS. 4 through 7, and the structure of FIG. 9 can be used to correct a touch signal for water effects. In the example of FIG. 3, after the self and mutual capacitance measurements are captured (310-340), a correction factor K can be calculated and the correction factor can then be used to calculate a touch signal corrected for water effects and any other adverse conditions (360). As described previously, the correction factor K can be a function of the row self capacitance measurement Xr, the column self capacitance measurement Xc, the mutual capacitance measurement between row traces Yrr, and the mutual capacitance measurement between column traces Ycc. Water can generally contribute to the mutual capacitance measurements, causing the correction factor K to be larger than it should be. As a result, the correction factor K can overcorrect in the touch signal calculations to generate overcompensated false touches at the water contact locations on the panel, particularly when a touch or hover event and a water droplet share the same row and/or column traces. Once the touch signal is corrected, the water locations can be identified based on the fact that the water touch signal will still remain negative. In some examples, the touch signals calculated at the identified water locations can be discarded. In some examples, the touch signal calculations can be skipped at the identified water locations.

In an alternate example, when the row-to-column mutual capacitances are measured (320), the water locations can be identified from these measurements, as described previously. The row-to-row and column-to-column mutual capacitances Yrr, Ycc can then be selectively measured at the non-water locations (330-340) so that the correction factor K is not overestimated.

In the example of FIG. 8B, rather than using the correction factor to calculate a touch signal (890), the mutual capacitance measurement Yrc, measured in (870), can be used to determine the touch signal unless the Yrc measurement indicates the presence of water, e.g., a negative capacitance. In which case, the self capacitance measurements Xr, Xc, measured in (860), can be used to determine the touch signal.

Various user grounding conditions and water effects can be corrected in touch signals at a touch panel according to various examples described herein. In one example, when a poorly grounded user's ten fingers and two palms are touching in close proximity on the panel, negative capacitance can affect some or all of the touch signals, e.g., the ring and index finger touch signals can be substantially impacted by negative capacitance. Applying the correction methods described herein, the negative capacitance effects can be corrected and the correct touch signals recovered at the correct locations on the panel.

In a second example, water patches can be added to the touch conditions in the first example, e.g., with the water patches disposed between the thumbs and the palms, causing negative capacitance from both the fingers' proximity and the water. Applying the correction methods described herein, the negative capacitance effects can be corrected in the touch signals to recover the actual touch signals at the correct locations on the panel and to minimize the false touches caused by the water.

In a third example, when water patches are large compared to fingers touching on the panel, the water substantially contribute to the negative capacitance so as to overwhelm the touch signals. Applying the correction methods described herein, the water locations can either be skipped or the calculated touch signals involving the water locations discarded so that the actual touch signals can be recovered at the correct locations on the panel without any false touches caused by water.

In a fourth example, two users can be touching the panel, where one user is well grounded and the other user is poorly grounded. In some cases, the well-grounded user can effectively ground the poorly grounded user such that the poorly grounded user's effect on the touch signals is lower. Accordingly, applying the correction methods described herein, lesser correction can be made to the touch signals, compared to the poorly grounded user alone touching the panel.

In a fifth example, display noise can be introduced into the touch conditions of the first example, causing touch signal interference in addition to the negative capacitance due to poor grounding. Applying the correction methods described herein, the negative capacitance effects can be corrected and the noise minimized such that the correct touch signals are recovered at the correct locations on the panel.

Figure 10:
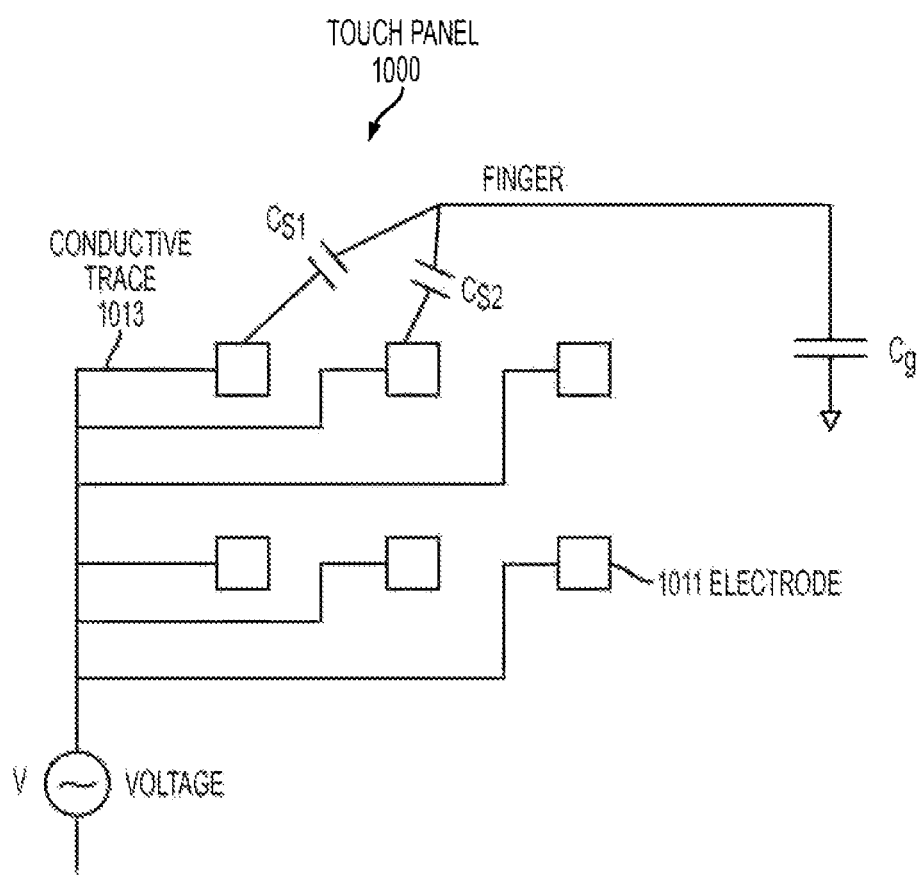
FIG. 10 illustrates an exemplary touch panel with a pixelated electrode configuration according to various examples.
Figure 12:
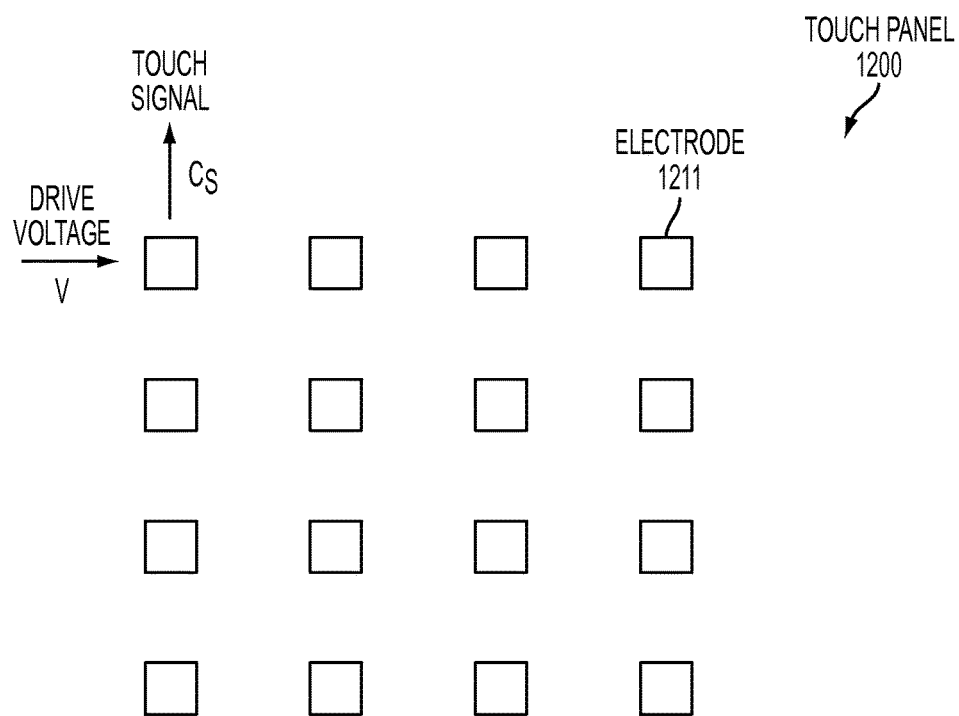
FIGS. 12 through 18B (including FIG. 18A) illustrate exemplary pixelated electrode patterns in a touch panel for measuring mutual and self capacitance according to various examples.

Another type of touch panel can have a pixelated electrode pattern. FIG. 10 illustrates an exemplary pixelated electrode touch panel. In the example of FIG. 10, touch panel 1000 can include an array of individual touch electrodes 1011, although it should be understood that other electrode configurations can be employed. Each electrode 1011 can have conductive trace 1013 coupled thereto to drive the electrode with drive voltage V and a sensor trace (not shown) to transmit touch signals to sensing circuitry. Each electrode 1011 can have an associated self capacitance relative to ground and can form self capacitance Cs with a proximate finger (or other object). FIG. 12 illustrates an exemplary pixelated touch panel capturing a touch signal. In the example of FIG. 12, touch panel 1200 can include touch electrode 1211, which can be driven by drive voltage V provided by drive circuitry (not shown) to form capacitance Cs with a finger, indicative of a touch at the panel 1200. The touch signal Cs can be transmitted to sense circuitry (not shown).

Referring again to FIG. 10, when a well-grounded user's finger (or other object) touches or hovers over the panel 1000, the finger can form a self capacitance Cs with the electrode 1011 at the touch location. This capacitance can be caused by charge or current from driven conductive trace 1013 to the electrode 1011. In some examples, the electrodes 1011 can be coupled to and driven by the same voltage source. In other examples, the electrodes 1011 can each be coupled to and driven by different voltage sources. Touch signals representative of the capacitance Cs can be transmitted by sensor traces to sense circuitry (not shown) for processing. The touch signals can indicate the electrode 1011 where the touch occurred and the amount of touch that occurred at that electrode location.

However, as illustrated in FIG. 10, when a poorly grounded user's finger (or other object) touches or hovers over the panel 1000, the capacitance Cg can be poor such that the capacitance Cs formed between the electrode 1011 and the user's finger is different from what it should be. In this example, the finger can be within detectable distance of two electrodes 1011. A finger capacitance Cs1 to the first electrode and a finger capacitance Cs2 to the second electrode can form. However, because user to ground capacitance Cg is poor, the finger capacitance Cs1, Cs2 can be incorrect. Based on the incorrect capacitance Cs1, Cs2, the panel 1000 can fail to differentiate between a touching, but poorly grounded finger and a hovering, but well-grounded finger.

Accordingly, detecting the poor grounding and correcting the touch signals for the poor grounding, using mutual and/or self capacitance measurements, can improve touch detection of the touch panel in poor user grounding conditions. Similar improvements can be realized for other adverse conditions.

Figure 11:
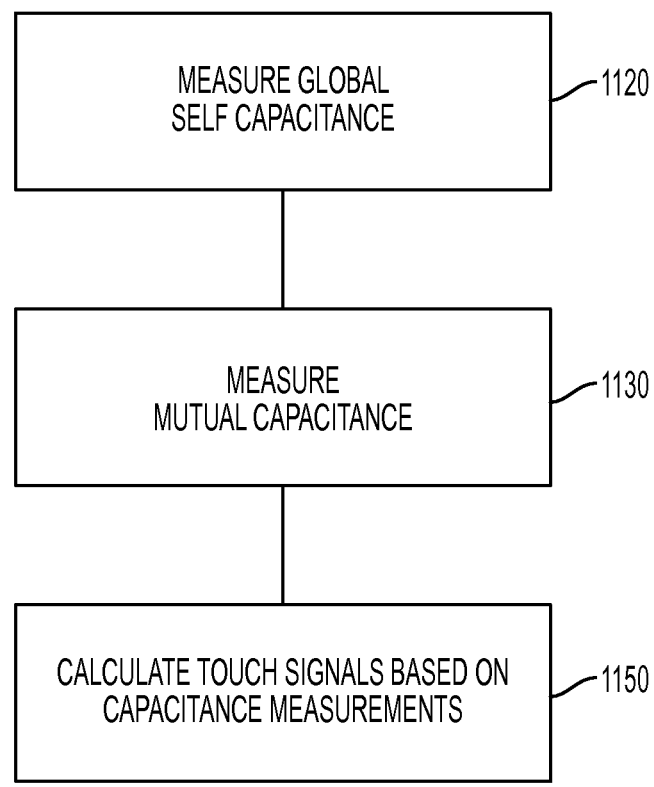
FIG. 11 illustrates an exemplary method for measuring mutual and self capacitance from multiple pixelated electrode patterns in a touch panel according to various examples.
Figure 13:
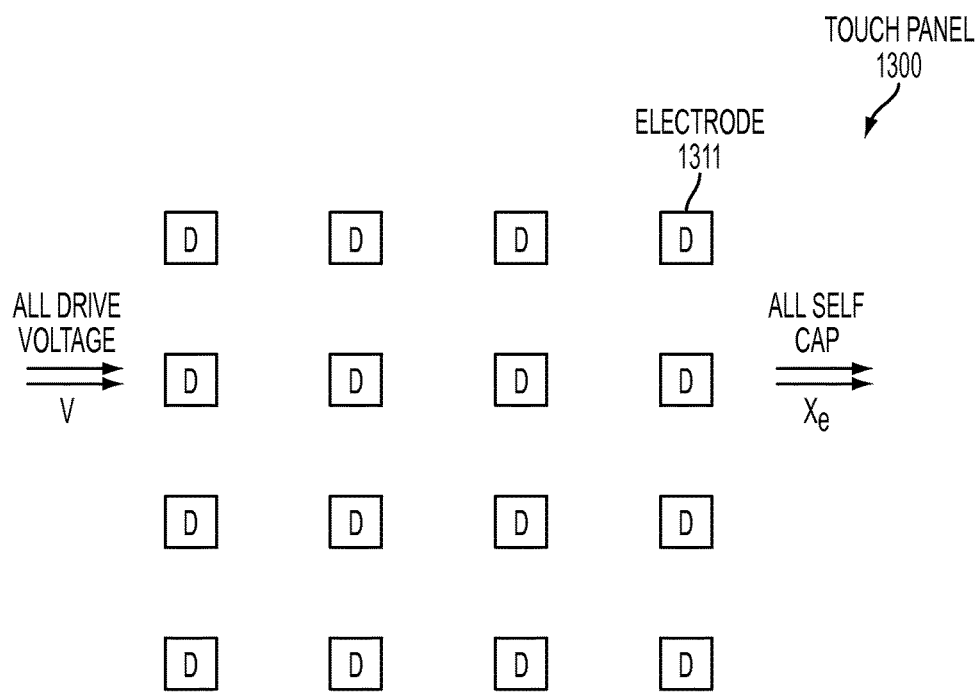

FIG. 11 illustrates an exemplary method for measuring both mutual and self capacitance in the pixelated touch panel of FIG. 10. In the example of FIG. 11, a touch panel can capture self and mutual capacitances at various pixelated electrode patterns in the panel and calculate a touch signal using the mutual and self capacitance measurements. Accordingly, the panel can measure global self capacitances Xe of the electrodes in the panel (1120). FIG. 13 illustrates an exemplary pixelated touch panel measuring global self capacitances, using a boot strap operation. In the example of FIG. 13, electrodes 1311 can be driven simultaneously by drive voltage V provided by drive circuitry (not shown) and can transmit self capacitances Xe to sense circuitry (not shown). The label "D" on each electrode 1311 can indicate that the electrode is being driven. Accordingly, the self capacitances Xe can be measured in a single operation.

Figure 14:
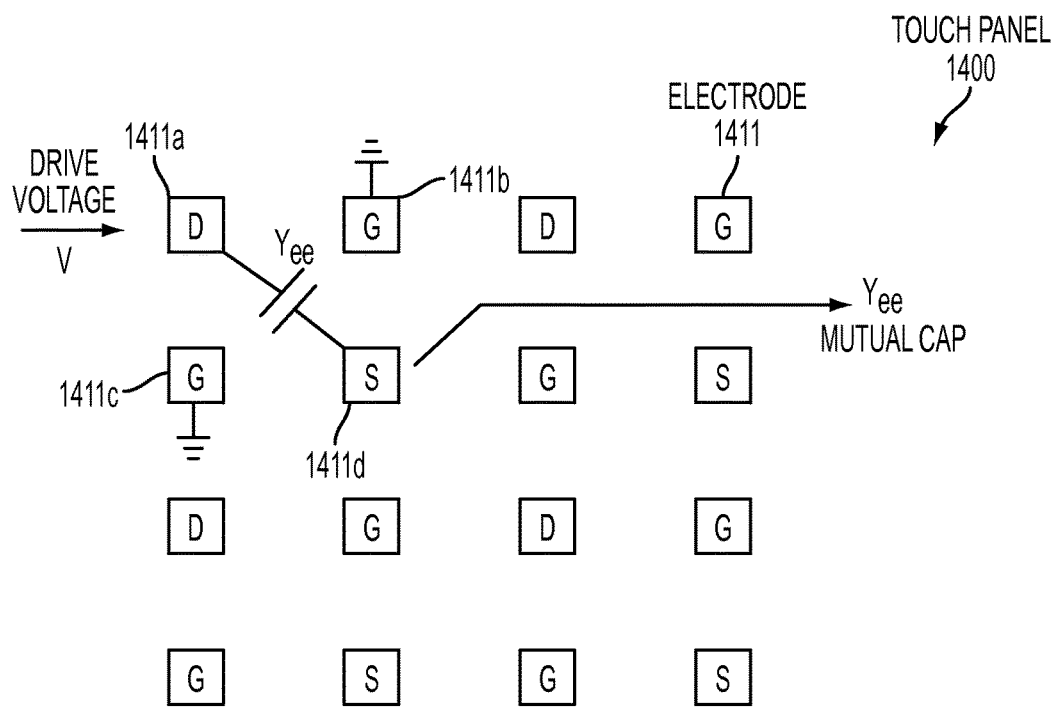

Referring again to FIG. 11, after measuring the global self capacitances, the panel can measure mutual capacitances Yee between diagonal electrodes in the panel (1130). FIGS. 14 through 17 illustrate exemplary pixelated electrode patterns measuring electrode mutual capacitances. In the example of FIG. 14, touch panel 1400 can be configured to form a pixelated electrode pattern with electrode 1411*a* as a drive electrode, horizontally adjacent electrode 1411*b* as a ground electrode, vertically adjacent electrode 1411*c* as another ground electrode, diagonal electrode 1411*d* as a sense electrode, and the pattern repeated for the remaining electrodes. The label "D" on certain electrodes 1411 can indicate the electrode is being driven, the label "G," the electrode being grounded, and the label "S," the electrode sensing mutual capacitance. The drive electrode 1411*a* and the sense electrode 1411*d* can form mutual capacitance Yee therebetween. The drive electrode 1411*a* can be driven by drive voltage V provided by drive circuitry (not shown) and the sense electrode 1411d can transmit mutual capacitance Yee to sense circuitry (not shown).

Figure 15:
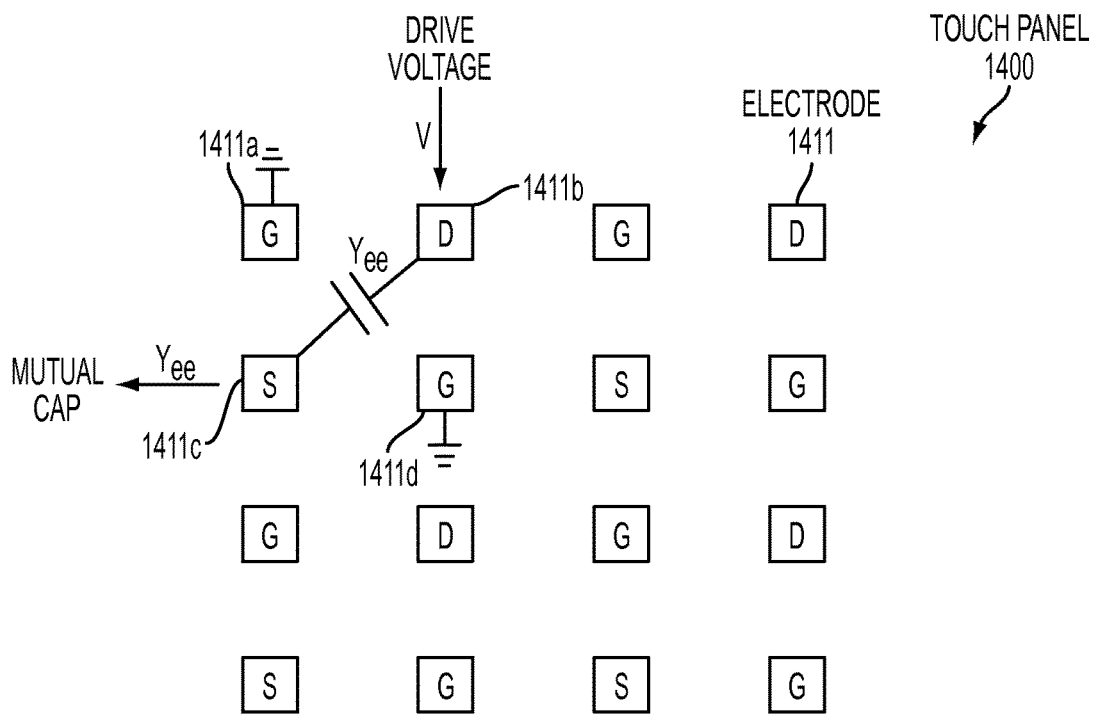

To ensure that mutual capacitances are measured for all the electrodes, the panel can be configured to form a second pixelated electrode pattern by rotating the pattern of FIG. 14 clockwise 45 degrees. FIG. 15 illustrates the second pixelated electrode pattern. In the example of FIG. 15, touch panel 1400 can be configured to form a pixelated electrode pattern with electrode 1411a now as a ground electrode, electrode 1411b as a drive electrode, electrode 1411c as a sense electrode, electrode 1411d as another ground electrode, and the pattern repeated for the remaining electrodes. The drive electrode 1411b and the sense electrode 1411c can form mutual capacitance Yee therebetween.

Figure 16:
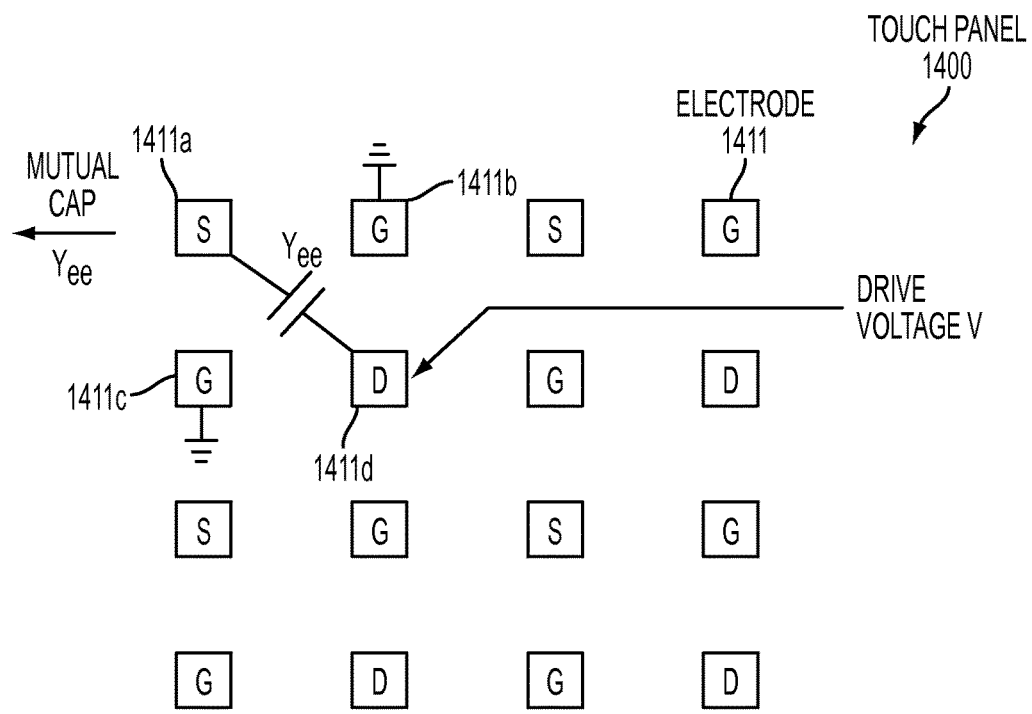
Figure 17:
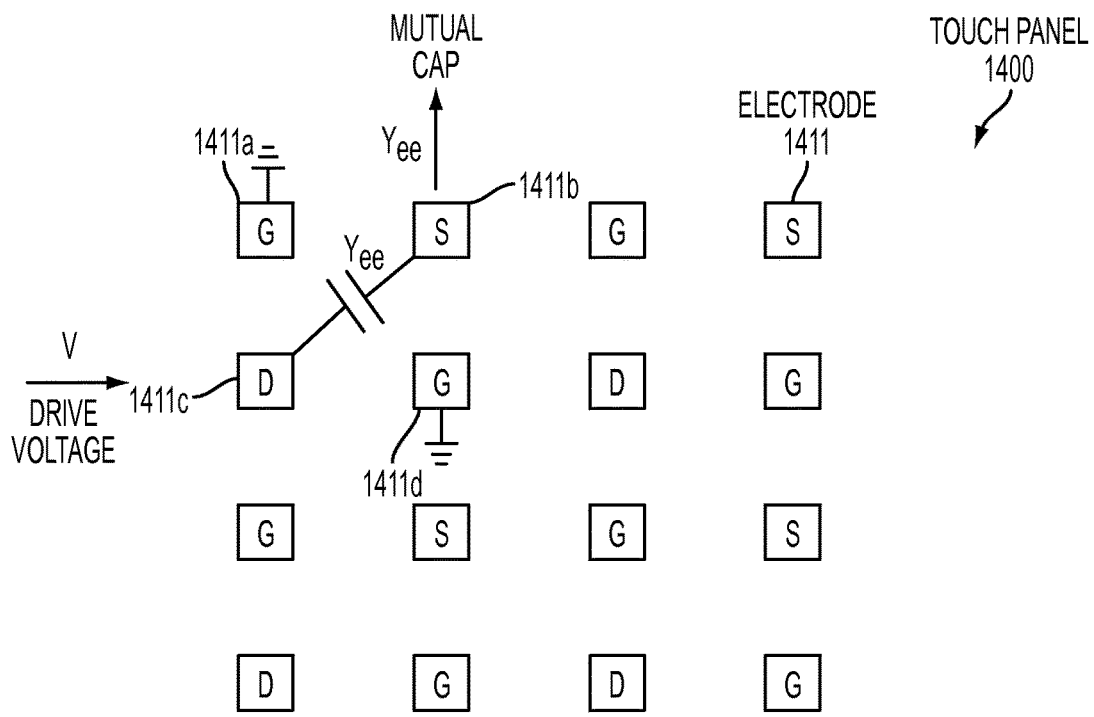

Generally, the patterns of FIGS. 14 and 15 can be sufficient to measure mutual capacitances between electrodes. However, two more patterns as illustrated in FIGS. 16 and 17 can be used for additional measurements to average with the measurements obtained from the patterns of FIGS. 14 and 15. FIG. 16 illustrates a third pixelated electrode pattern formed by rotating the pattern of FIG. 15 clockwise 45 degrees. In the example of FIG. 16, touch panel 1400 can be configured to form a pixelated electrode pattern with electrode 1411a now as a sense electrode, electrode 1411b as a ground electrode, electrode 1411c as another ground electrode, electrode 1411d as a drive electrode, and the pattern repeated for the remaining electrodes. The drive electrode 1411d and the sense electrode 1411a can form mutual capacitance Yee therebetween.

FIG. 17 illustrates a fourth pixelated electrode pattern formed by rotating the pattern of FIG. 16 clockwise 45 degrees. In the example of FIG. 17, touch panel 1400 can be configured to form a pixelated electrode pattern with electrode 1411a now as a ground electrode, electrode 1411b as a sense electrode, electrode 1411c as a drive electrode, electrode 1411d as another ground electrode, and the pattern repeated for the remaining electrodes. The drive electrode 1411c and the sense electrode 1411b can form mutual capacitance Yee therebetween. Accordingly, the mutual capacitances Yee can be measured in either two operations (FIGS. 14 and 15 patterns) or four operations (FIGS. 14 through 17 patterns).

As described previously, when all four patterns are used, the mutual capacitances can be averaged. For example, the mutual capacitances between electrodes 1411a, 1411d, measured using the patterns of FIGS. 14 and 16, can be averaged to provide the mutual capacitance Yee between these two electrodes. Similarly, the mutual capacitances between electrodes 1411b, 1411c, measured using the patterns of FIGS. 15 and 17, can be averaged to provide the mutual capacitance Yee between these two electrodes. The same can be done for the remaining electrodes in the panel.

Figure 18A:
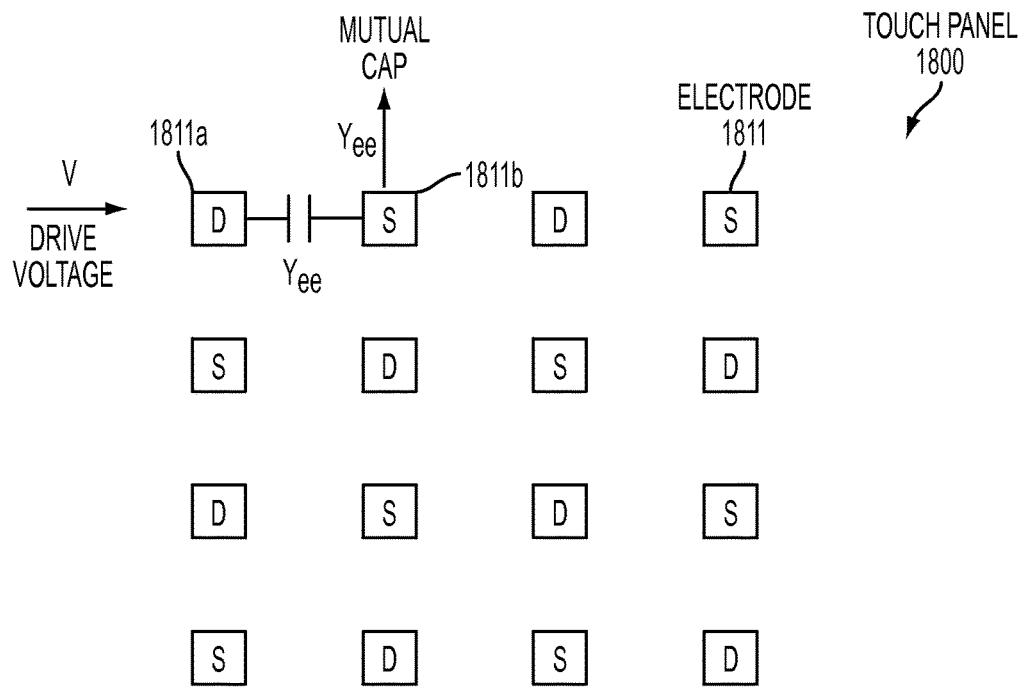

FIG. 18 illustrates alternate pixelated electrode patterns measuring electrode mutual capacitances that can replace the patterns of FIGS. 14 through 17. In the example of FIG. 18A, touch panel 1800 can be configured to form a pixelated electrode pattern with electrode 1811a as a drive electrode, horizontally adjacent electrode 1811b as a sense electrode, and the pattern repeated for the remaining electrodes. The label "D" on certain electrodes 1811 can indicate the electrode is being driven and the label "S," the electrode sensing mutual capacitance. Unlike the patterns of FIGS. 14 through 17, the patterns of FIG. 18 can omit grounding certain electrodes. The drive electrode 1811a and the sense electrode 1811b can form mutual capacitance Yee therebetween. The drive electrode 1811a can be driven by drive voltage V provided by drive circuitry (not shown) and the sense electrode 1811b can transmit mutual capacitance Yee to sense circuitry (not shown).

Figure 18B:
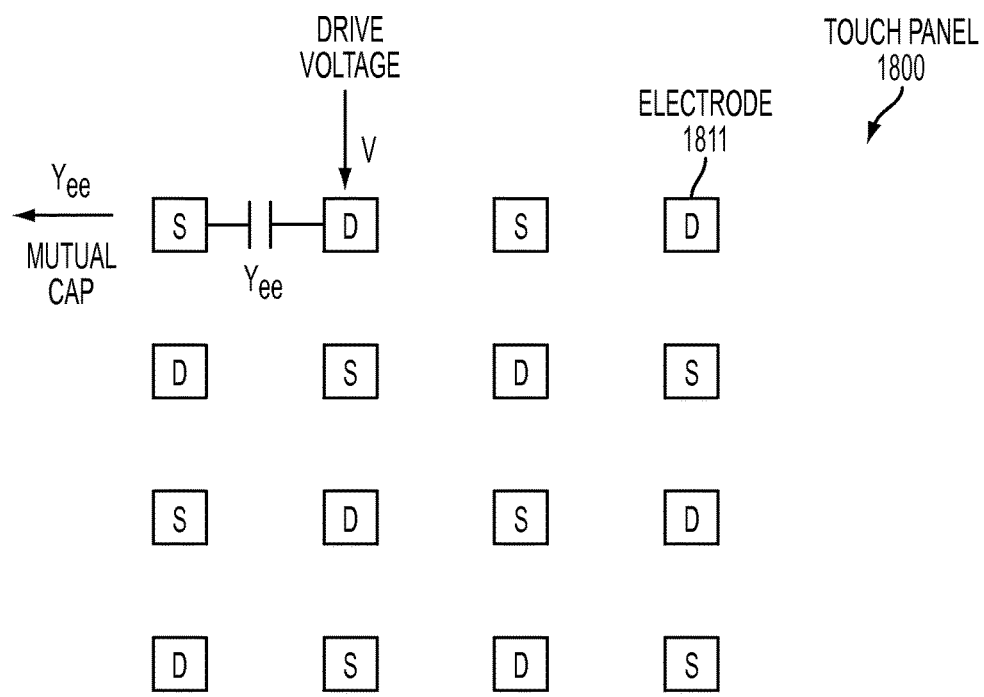

Generally, the pattern of FIG. 18A can be sufficient to measure mutual capacitances between electrodes. However, a second pattern as illustrated in FIG. 18B can be used for additional measurements to average with the measurements obtained from the pattern of FIG. 18A. In the example of FIG. 18B, touch panel 1800 can be configured to form a pixelated electrode pattern with electrode 1811a now as a sense electrode, electrode 1811b as a drive electrode, and the pattern repeated for the remaining electrodes. The drive electrode 1811b and the sense electrode 1811a can form mutual capacitance Yee therebetween. Accordingly, the mutual capacitances Yee can be measured in either one operation (FIG. 18A pattern) or two operations (FIGS. 18A and 18B patterns). The mutual capacitances between electrodes 1811a, 1811b measured using the two patterns of FIG. 18 can be averaged to provide the mutual capacitance Yee between the two electrodes. The same can be done for the remaining electrodes in the panel.

It should be understood that the pixelated electrode patterns are not limited to those illustrated in FIGS. 14 through 18, but can include other or additional patterns suitable for measuring self and mutual capacitance of electrodes in the touch panel. For example, a pixelated electrode pattern can be configured to include a first row of electrodes being drive electrodes, a second row of electrodes being ground electrodes, a third row of electrodes being sense electrodes to form mutual capacitances with the first row electrodes, a fourth row of electrodes being ground electrodes, and the pattern repeated for the remaining electrode rows. In another example, a pixelated electrode pattern can be configured to include a first electrode being a drive electrode, adjacent electrodes surrounding the first electrode being ground electrodes, adjacent electrodes surrounding the ground electrodes being sense electrodes to form mutual capacitances with the first electrode, and the pattern repeated for the remaining electrodes.

Referring again to FIG. 11, after measuring the mutual capacitances, a touch signal can be calculated based on the global self capacitances and the mutual capacitances (1150).

In some examples, a correction factor, indicative of an adverse condition, can be determined based on the self and mutual capacitance measurements and the correction factor can be used to calculate a touch signal corrected for the adverse condition (1150). Equation (2) can be used to calculate the corrected touch signal.

$$Cm_i = \left[ \frac{Cg}{\sum_i Cm_{i,actual} + Cg} \right] Cm_{i,actual} \quad (2)$$

where $Cm_i$=the captured touch signal at touch electrode i, $Cm_{i,actual}$=the corrected touch signal at electrode i, and $Cg=f(Xe_i, Ye_ie_j)$, user ground capacitance, where Cg is a function of $Xe_i$ (self capacitance measurement of touch electrode i when all touch electrodes are simultaneously driven, boot-strapped) and $Ye_ie_j$ (mutual capacitance measurement of touch electrode i to touch electrode j), and indicative of the adverse condition. An alternate way of computing the correction factor form can be $K=Cg/[\text{sum}(Cm_{i,actual})+Cg]=K(Xe_i, Ye_ie_j)$, which leads to a simple global scalar correction factor form of $Cm_i=K\ Cm_{i,actual}$.

Figure 19:
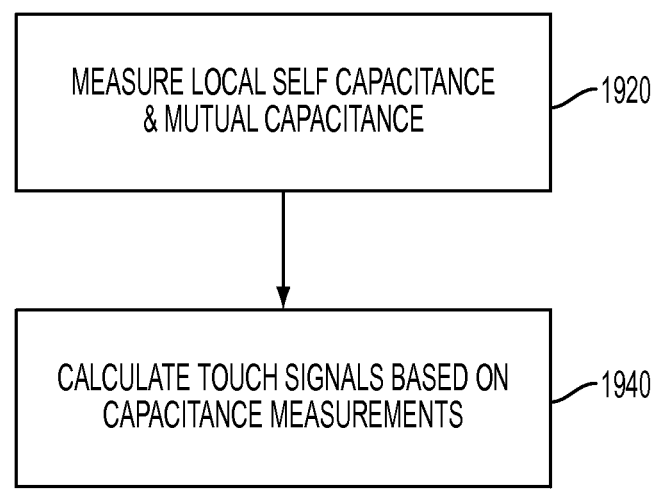
FIG. 19 illustrates another exemplary method for measuring mutual and self capacitance from multiple pixelated electrode patterns in a touch panel according to various examples.
Figure 20A:
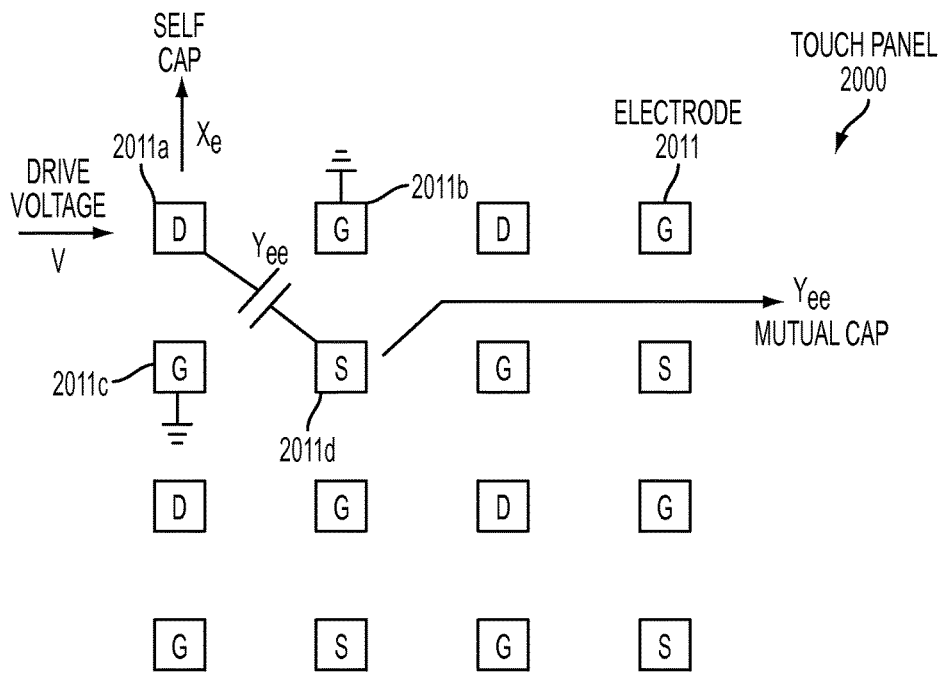
FIGS. 20A and 20B illustrate other exemplary pixelated electrode patterns in a touch panel for measuring mutual and self capacitance according to various examples.

FIG. 19 illustrates another exemplary method for measuring both mutual and self capacitance in the pixelated electrode touch panel of FIG. 10. The FIG. 19 method is similar to the FIG. 11 method, but can replace the measuring of global self capacitance with the measuring of local self capacitance and can measure the local self capacitance and mutual capacitance simultaneously. In the example of FIG. 19, a touch panel can measure the mutual capacitance Yee between the electrodes and additionally measure local self capacitance Xe at the same time, using a non-boot strap operation (1920). FIG. 20A illustrates an exemplary pixelated electrode pattern measuring self and mutual capacitance. In the example of FIG. 20A, similar to FIG. 14, touch panel 2000 can be configured to form a pixelated electrode pattern with electrode 2011a as a drive electrode, horizontally adjacent electrode 2011b as a ground electrode, vertically adjacent electrode 2011c as another ground electrode, diagonal electrode 2011d as a sense electrode, and the pattern repeated for the remaining electrodes. To measure the local self capacitance, while electrode 2011a is being driven to provide the mutual capacitance Yee between it and sense electrode 2011d, the self capacitance Xe of drive electrode 2011a can be measured. Additional pixelated electrode patterns similar to those of FIGS. 15 through 17 can be formed, in which drive electrode 1411b has its self capacitance measured (FIG. 15), drive electrode 1411c has its self capacitance measured (FIG. 16), and drive electrode 1411d has its self capacitance measured (FIG. 17), for example.

Referring again to FIG. 19, after measuring the self and mutual capacitances, a touch signal can be calculated based on the local self capacitances and the mutual capacitances (1940).

In some examples, a correction factor, indicative of an adverse condition, can be determined based on the self and mutual capacitance measurements and used to calculate a touch signal corrected for the adverse condition (1940). As described previously, Equation (2) can be used to perform the correction.

It should be understood that the pixelated electrode patterns are not limited to that illustrated in FIG. 20A, but can include other or additional patterns suitable for measuring self and mutual capacitance of electrodes in the touch panel. For example, a pixelated electrode pattern can be configured to include a first row of electrodes being drive electrodes, a second row of electrodes being sense electrodes to form mutual capacitances with the first row electrodes, a third row of electrodes being sense electrodes to form mutual capacitances with the first row electrodes, a fourth row of electrodes similar to the second electrode row, and the pattern repeated for the remaining electrode rows. In another example, a pixelated electrode pattern can be configured as a first electrode being a drive electrode, adjacent electrodes surrounding the first electrode being sense electrodes to form mutual capacitances with the first electrode, a second group of adjacent electrodes surrounding the first group being sense electrodes to form mutual capacitances with the first electrode, a third group of adjacent electrodes being similar to the first adjacent group, and the pattern repeated for the remaining electrodes.

Figure 20B:
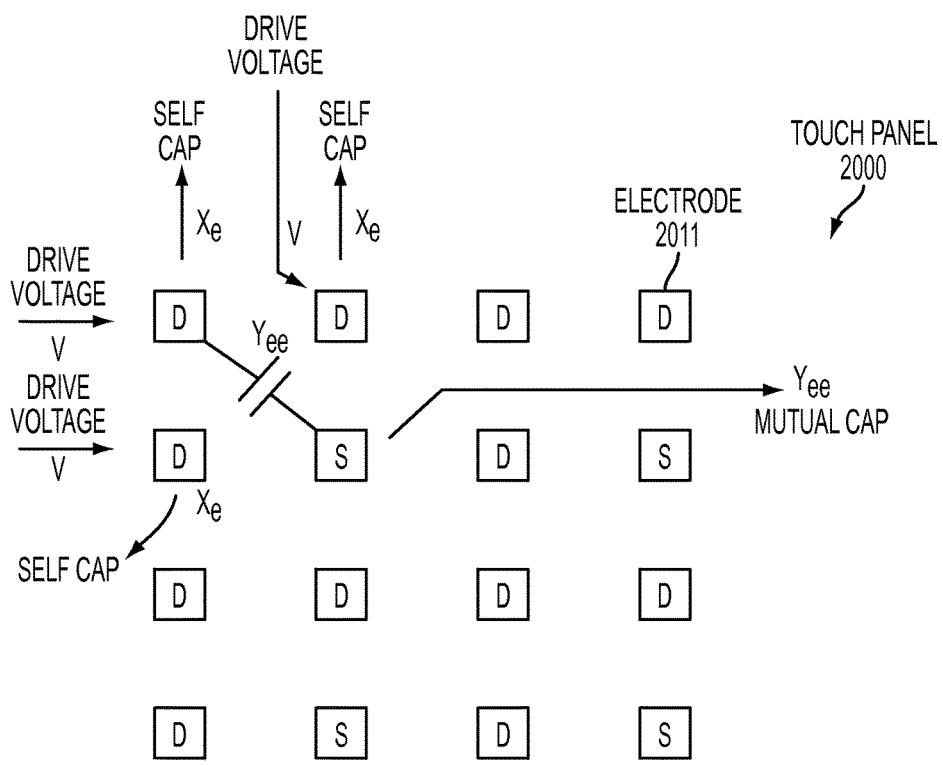

FIG. 20B illustrates another exemplary pixelated electrode pattern measuring self and mutual capacitance that can replace the pattern of FIG. 20A. In the example of FIG. 20B, touch panel 2000 can be configured to form a pixelated electrode pattern with electrode 2011a as a drive electrode, electrode 2011b as another drive electrode, electrode 2011c as a third drive electrode, electrode 2011d as a sense electrode, and the pattern repeated for the remaining electrodes. Here, while electrode 2011a is being driven to form the mutual capacitance Yee between it and sense electrode 2011d, the self capacitance Xe of electrode 2011a can be measured. At the same time, electrodes 2011b, 2011c can also be driven and their self capacitances Xe measured. Additional pixelated electrode patterns similar to those of FIGS. 15 and 17 can be formed, except the ground electrodes can be replaced with drive electrodes. For example, similar to FIG. 15, electrodes 1411a, 1411d can be driven and their self capacitances measured. Similar to FIG. 16, electrodes 1411b, 1411c can be driven and their self capacitances measured. Similar to FIG. 17, electrodes 1411a, 1411d can be driven and their self capacitances measured.

It should be understood that the pixelated electrode patterns are not limited to that illustrated in FIG. 20B, but can include other or additional patterns suitable for measuring self and mutual capacitance of electrodes in the touch panel. For example, a pixelated electrode pattern can be configured to include a first row of electrodes being drive electrodes, a second row of electrodes being drive electrodes, a third row of electrodes being sense electrodes to form mutual capacitances with the first row electrodes, a fourth row of electrodes being similar to the second row, and the pattern repeated for the remaining electrode rows. In another example, a pixelated electrode pattern can be configured to include a first electrode being a drive electrode, adjacent electrodes surrounding the first electrode being drive electrodes, a second group of adjacent electrodes surrounding the first adjacent group being sense electrodes to form mutual capacitances with the first electrode, a third group of adjacent electrodes surrounding the second group being similar to the first adjacent group, and the pattern repeated for the remaining electrodes.

Figure 21:
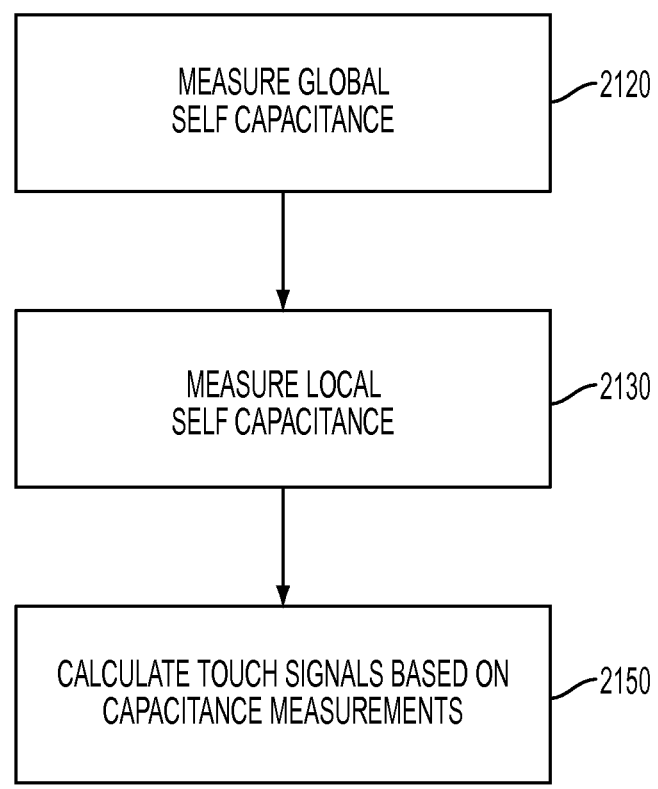
FIG. 21 illustrates an exemplary method for measuring self capacitance from multiple pixelated electrode patterns in a touch panel according to various examples.
Figure 22:
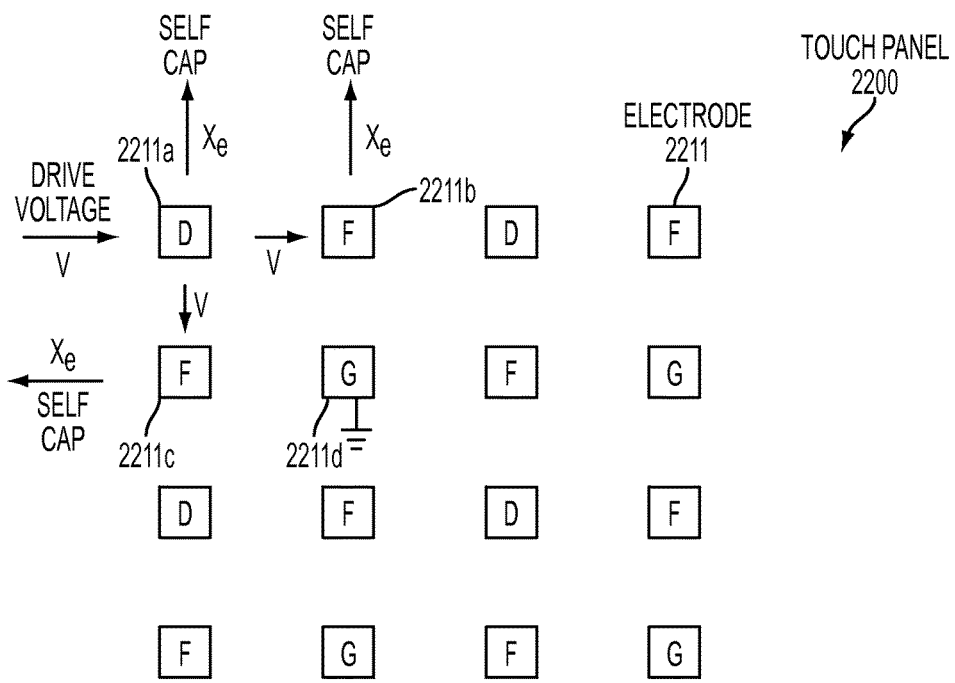
FIGS. 22 through 25 illustrate exemplary pixelated electrode patterns in a touch panel for measuring self capacitance according to various examples.

FIG. 21 illustrates an exemplary method for measuring multiple self capacitances in the pixelated electrode touch panel of FIG. 10. The FIG. 21 method is similar to the FIG. 11 method, but can replace the measuring of mutual capacitance with the measuring of local self capacitance. In the example of FIG. 21, a touch panel can capture self capacitances at various pixelated electrode patterns in the panel and use the measurements to calculate a touch signal. Accordingly, the panel can measure global self capacitances Xe of the electrodes in the panel, as illustrated in FIG. 13, in a boot strap operation (2120). The panel can then measure local self capacitances Xe of the electrodes in the panel, in a non-boot strap operation (2130). FIGS. 22 through 25 illustrate exemplary pixelated electrode patterns measuring local self capacitances. In the example of FIG. 22, touch panel 2200 can be configured to form a pixelated electrode pattern with electrode 2211a as a drive electrode, horizontally adjacent electrode 2211b as a following electrode, vertically adjacent electrode 2211c as another following electrode, diagonal electrode 2211d as a ground electrode, and the pattern repeated for the remaining electrodes. The label "D" on certain electrodes 1411 can indicate the electrode is being driven, the label "G," the electrode being grounded, and the label "F," the electrode being driven, but its self capacitance not measured. The drive electrode 2211a can be driven by drive voltage V provided by drive circuitry (not shown), with the self capacitance Xe for that electrode being transmit to sense circuitry (not shown). The following electrodes 2211b, 2211c can also be driven by drive voltage V. By driving the following electrodes 2211b, 2211c, unwanted parasitic capacitances formed between the following electrodes and the adjacent drive electrode 2211a can be minimized, so as not to interfere with the self capacitance Xe from the drive electrode.

Figure 23:
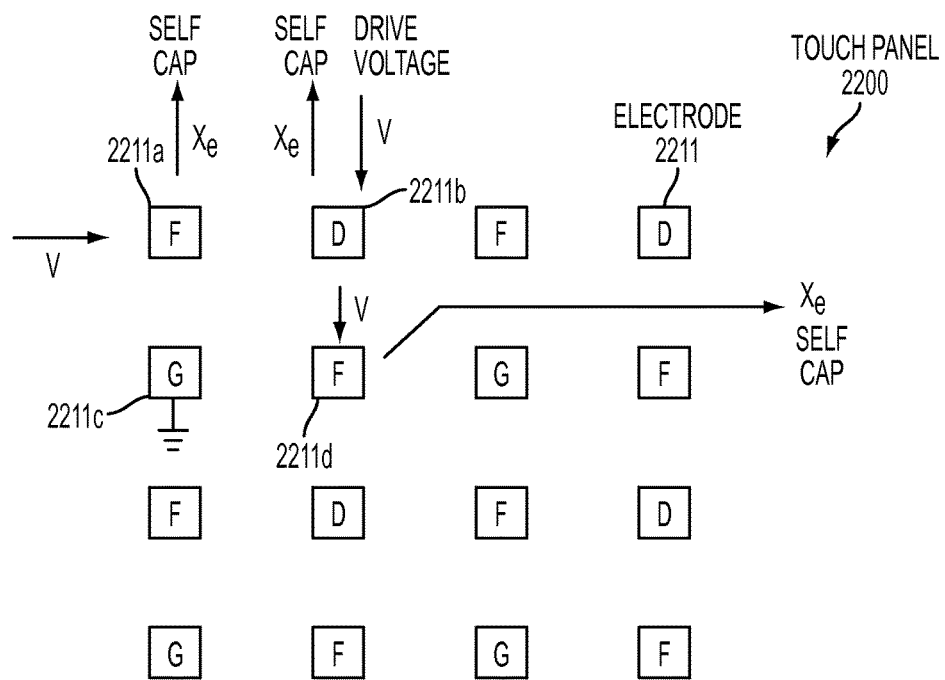

To ensure that local self capacitances are measured for all the electrodes, the panel can be configured to form a second pixelated electrode pattern by rotating the pattern of FIG. 22 clockwise 45 degrees. FIG. 23 illustrates the second pixelated electrode pattern. In the example of FIG. 23, touch panel 2200 can be configured to form a pixelated electrode pattern with electrode 2211a now as a following electrode, electrode 2211b as a drive electrode, electrode 2211c as a ground electrode, electrode 2211d as another following electrode, and the pattern repeated for the remaining electrodes. The self capacitance Xe of drive electrode 2211b can be measured.

Figure 24:
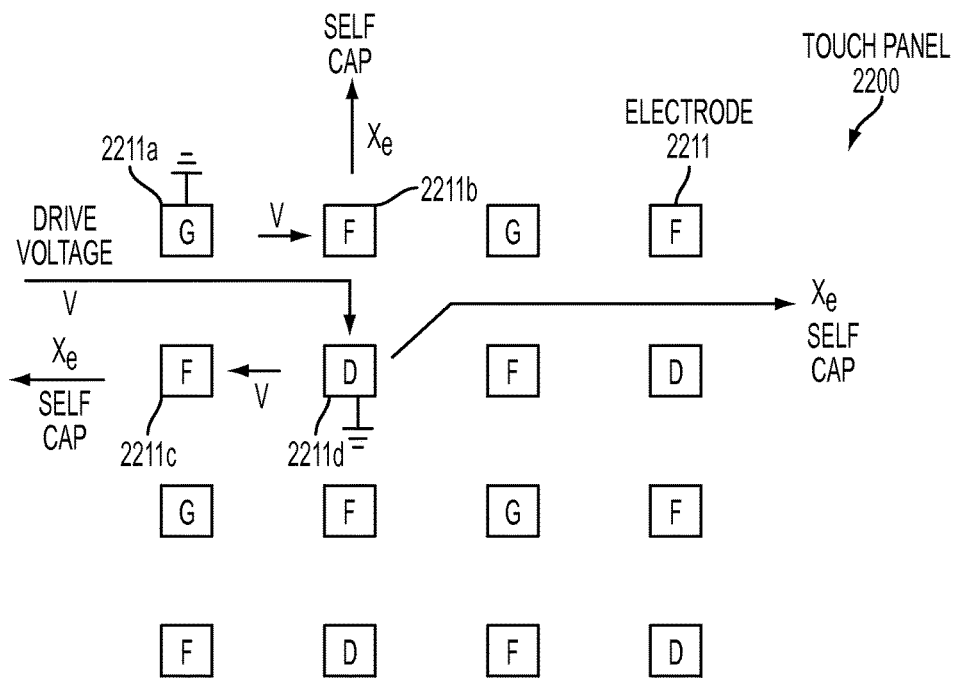
Figure 25:
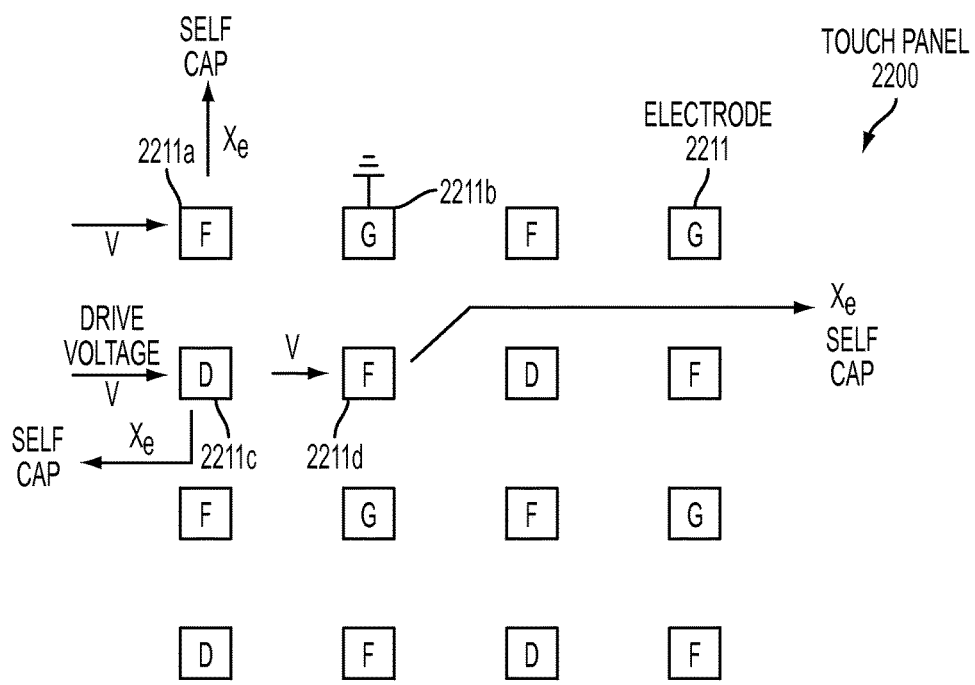

Generally, the patterns of FIGS. 22 and 23 can be sufficient to measure the local self capacitances. However, two more patterns as illustrated in FIGS. 24 and 25 can be used for additional measurements to average with the measurements obtained from the patterns of FIGS. 22 and 23. FIG. 24 illustrates a third pixelated electrode pattern formed by rotating the pattern of FIG. 23 clockwise 45 degrees. In the example of FIG. 24, touch panel 2200 can be configured to form a pixelated electrode pattern with electrode 2211a now as a ground electrode, electrode 2211b as a following electrode, electrode 2211c as another following electrode, electrode 2211d as a drive electrode, and the pattern repeated for the remaining electrodes. The self capacitance Xe of drive electrode 2211d can be measured.

FIG. 25 illustrates a fourth pixelated electrode pattern formed by rotating the pattern of FIG. 24 clockwise 45 degrees. In the example of FIG. 25, touch panel 2200 can be configured to form a pixelated electrode pattern with electrode 2211a now as a following electrode, electrode 2211b as a ground electrode, electrode 2211c as a drive electrode, electrode 2211d as another following electrode, and the pattern repeated for the remaining electrodes. The self capacitance Xe of drive electrode 2211c can be measured. Accordingly, the local self capacitances Xe can be measured in either two operations (FIGS. 22 and 23 patterns) or four operations (FIGS. 22 through 25 patterns).

It should be understood that the pixelated electrode patterns are not limited to those illustrated in FIGS. 22 through 25, but can include other or additional patterns suitable for measuring self capacitance of electrodes in the touch panel. For example, a pixelated electrode pattern can be configured with a first row of electrodes being drive electrodes, a second row of electrodes electrically following the drive electrodes, a third row of electrodes being ground electrodes, a fourth row of electrodes electrically following the drive electrodes, and the pattern repeated for the remaining electrode rows. In another example, a pixelated electrode pattern can be configured with a first electrode being a drive electrode, adjacent electrodes surrounding the first electrode being following electrodes, adjacent electrodes surrounding the following electrodes being ground electrodes, and the pattern repeated for the remaining electrodes.

Referring again to FIG. 21, after measuring the self capacitances, a touch signal can be calculated based on the global and local self capacitances (2150).

In some examples, a correction factor, indicative of an adverse condition, can be determined based on the self capacitance measurements and used to calculate a touch signal corrected for the adverse condition (2150). As described previously, Equation (2) can be used to correct for adverse conditions.

Figure 26:
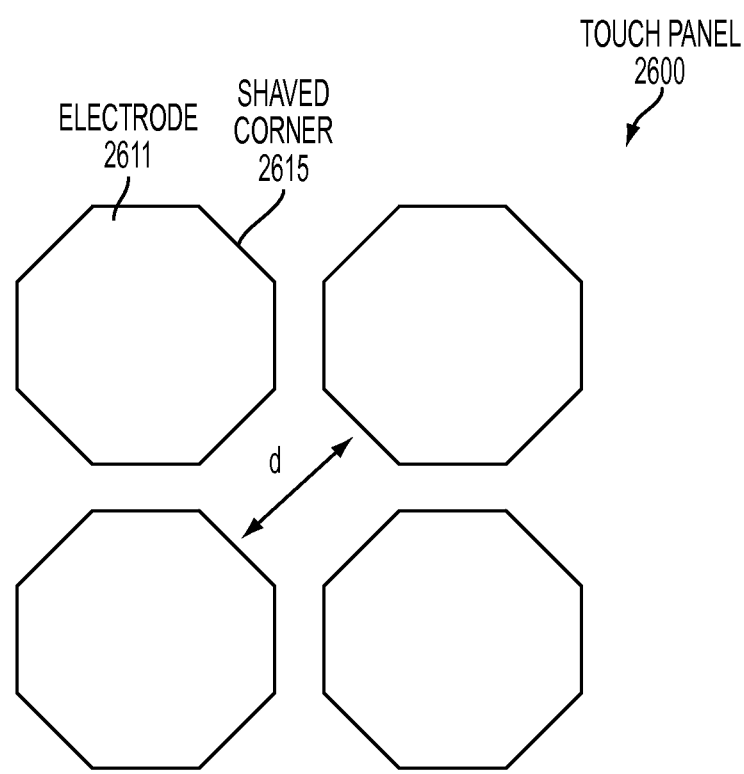
FIG. 26 illustrates an exemplary pixelated electrode structure in a touch panel on which to measure mutual and self capacitances according to various examples.

In addition to applying a correction factor to a touch signal to correct for adverse conditions, the structure of the touch electrodes can be designed so as to mitigate the adverse conditions. FIG. 26 illustrates an exemplary pixelated electrode structure that can be used. In the example of FIG. 26, touch panel 2600 can include an array of touch electrodes 2611 shaped like octagons, with corners 2615 being shaved to form a distance d between diagonal electrodes, although other shapes can be used to provide the distance between diagonal electrodes. This structure can advantageously maximize self capacitance forming touch signals, while minimizing mutual capacitance between diagonal electrodes that can negatively affect touch signals, and electrode to ground capacitance that can negatively affect touch signals.

Figure 27:
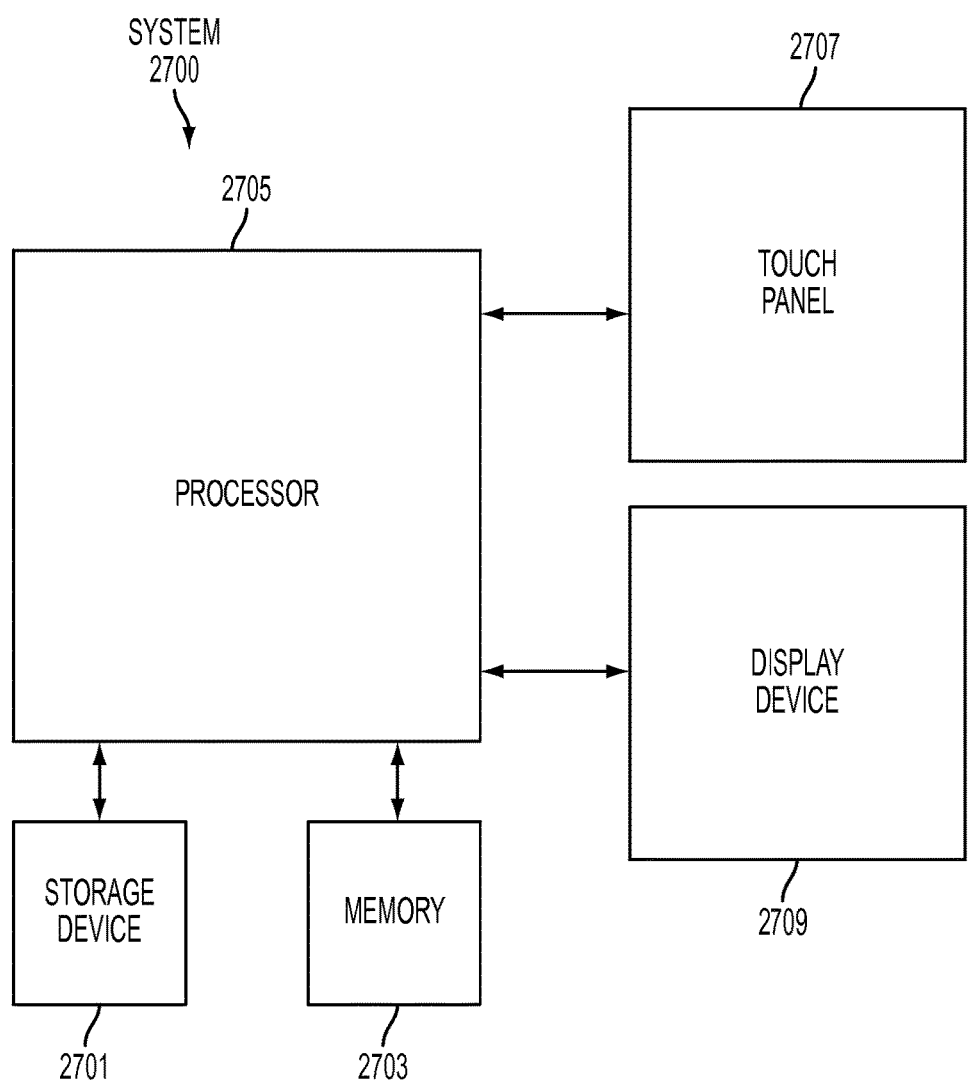
FIG. 27 illustrates an exemplary system for measuring mutual and self capacitance in a touch panel according to various examples.

One or more of the touch panels can operate in a system similar or identical to system 2700 shown in FIG. 27. System 2700 can include instructions stored in a non-transitory computer readable storage medium, such as memory 2703 or storage device 2701, and executed by processor 2705. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 2700 can also include display device 2709 coupled to the processor 2705. The display device 2709 can be used to display a graphical user interface. The system 2700 can further include touch panel 2707, such as in FIGS. 2 and 10, coupled to the processor 2705. Touch panel 2707 can have touch nodes capable of detecting an object touching or hovering over the panel at a location corresponding to a graphical user interface on the display device 2709. The processor 2705 can process the outputs from the touch panel 2707 to perform actions based on the touch or hover event and the displayed graphical user interface.

It is to be understood that the system is not limited to the components and configuration of FIG. 27, but can include other or additional components in multiple configurations according to various examples. Additionally, the components of system 2700 can be included within a single device, or can be distributed between multiple devices. In some examples, the processor 2705 can be located within the touch panel 2707 and/or the display device 2709.

Figure 28:
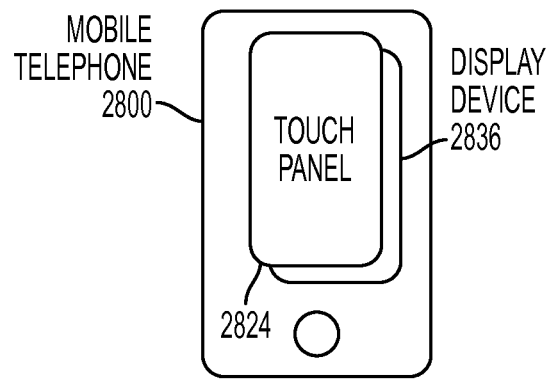
FIGS. 28 through 30 illustrate exemplary personal devices that can measure mutual and self capacitance in the devices' touch panels according to various examples.

FIG. 28 illustrates an exemplary mobile telephone 2800 that can include touch panel 2824, display 2836, and other computing system blocks that can measure both mutual and self capacitance in the touch panel according to various examples.

Figure 29:
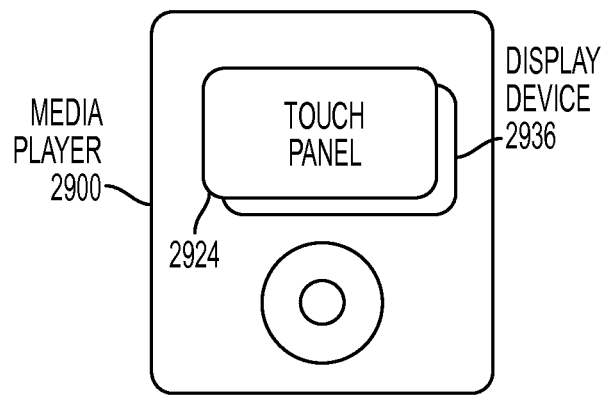

FIG. 29 illustrates an exemplary digital media player 2900 that can include touch panel 2924, display 2936, and other computing system blocks that can measure both mutual and self capacitance in the touch panel according to various examples.

Figure 30:
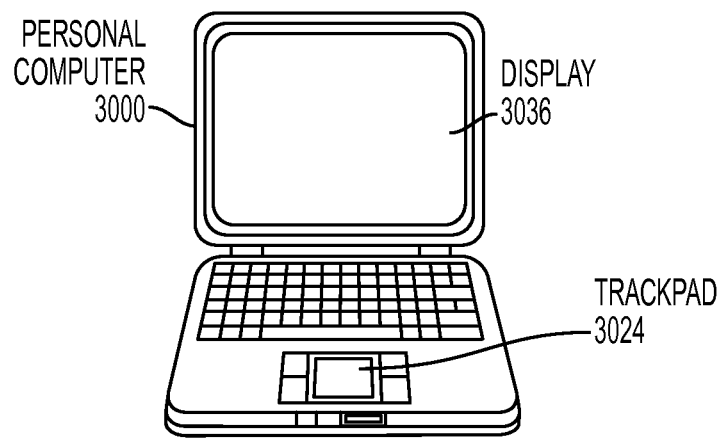

FIG. 30 illustrates an exemplary personal computer 3000 that can include touch panel (trackpad) 3024, display 3036, and other computing system blocks that can measure both mutual and self capacitance in the touch panel according to various examples.

The mobile telephone, media player, and personal computer of FIGS. 28 through 30 can advantageously provide more accurate and faster touch signal detection, as well as power savings, and more robustly adapt to various adverse conditions according to various examples.

Therefore, according to the above, some examples of the disclosure are directed to a method for measuring mutual and self capacitance at a touch panel comprising: measuring mutual and self capacitances at multiple touch node patterns in the touch panel; and calculating a touch signal, based on the measurements, the touch signal indicative of an object proximate to the touch panel. Additionally or alternatively to one or more examples disclosed above, the touch panel has a row-column electrode configuration, the touch panel including multiple rows of conductive traces and multiple columns of conductive traces, the columns crossing the rows to form mutual capacitances therebetween. Additionally or alternatively to one or more examples disclosed above, the touch signal comprises a mutual capacitance touch signal. Additionally or alternatively to one or more examples disclosed above, the measuring comprises: simultaneously measuring a first self capacitance of row conductive traces and a second self capacitance of column conductive traces of the touch panel at a first node pattern; measuring a first mutual capacitance between a pair of the row conductive traces at a second node pattern; and measuring a second mutual capacitance between a pair of the column conductive traces at a third node pattern. Additionally or alternatively to one or more examples disclosed above, the measuring comprises: simultaneously measuring a first self capacitance of row conductive traces and a second self capacitance of column conductive traces of the touch panel at a first node pattern; and simultaneously measuring a first mutual capacitance between a pair of the row conductive traces and a second mutual capacitance between a pair of the row and column conductive traces at a second node pattern. Additionally or alternatively to one or more examples disclosed above, the calculating further comprises: calculating the touch signal corrected for at least one of the proximate object being poorly grounded, water on the touch panel, or noise introduced into the touch panel. Additionally or alternatively to one or more examples disclosed above, the touch panel has a pixelated electrode configuration, the touch panel including an array of electrodes to form self capacitances between the electrodes and the object. Additionally or alternatively to one or more examples disclosed above, the touch signal comprises a self capacitance touch signal. Additionally or alternatively to one or more examples disclosed above, the measuring comprises: measuring a self capacitance globally from electrodes of the touch panel at a first node pattern; and measuring a mutual capacitance between a pair of the electrodes at a second node pattern. Additionally or alternatively to one or more examples disclosed above, the measuring comprises: simultaneously measuring a self capacitance locally from at least one of electrodes of the touch panel and a mutual capacitance between a pair of the electrodes at a first node pattern. Additionally or alternatively to one or more examples disclosed above, the measuring comprises: measuring a first self capacitance globally from electrodes of the touch panel at a first node pattern; and measuring a second self capacitance locally from at least one of the electrodes at a second node pattern. Additionally or alternatively to one or more examples disclosed above, the method further comprising: determining a correction factor based on the measured capacitances to correct for an adverse condition at the touch panel. Additionally or alternatively to one or more examples disclosed above, the determining comprises: determining the correction factor based on at least one of a first measurement of a first self capacitance of row conductive traces in the touch panel, a second measurement of a second self capacitance of column conductive traces in the touch panel, a third measurement of a first mutual capacitance between pairs of the row conductive traces, a fourth measurement of a second mutual capacitance between pairs of the column conductive traces, or a fifth measurement of a third mutual capacitance between pairs of the row and column conductive traces. Additionally or alternatively to one or more examples disclosed above, the determining comprises: determining the correction factor based on at least one of a first measurement of a first self capacitance globally from electrodes of the touch panel, a second measurement of a second self capacitance locally from at least one of the electrodes, or a third measurement of a mutual capacitance between a pair of the electrodes.

Other examples of the disclosure are directed to a touch device comprising: a touch panel having a set of touch nodes capable of measuring a mutual capacitance touch and a self capacitance touch; and a processor capable of receiving at least one of a set of mutual capacitance touch measurements or a set of self capacitance touch measurements taken from multiple patterns of the touch nodes, and calculating a touch signal at the touch panel using the at least one set of measurements. Additionally or alternatively to one or more examples disclosed above, the set of touch nodes comprises: multiple rows of conductive traces, each row trace having alternate wide and narrow portions, the wide portions tapering at distal ends to couple to the narrow portions; and multiple columns of conductive traces, each column trace having wide portions tapering at distal ends and bridges connecting the tapered distal ends of the wide portions, wherein the rows and columns cross each other at the narrow portions of the row traces and the bridges of the column traces. Additionally or alternatively to one or more examples disclosed above, a first pattern of the touch nodes comprises rows and columns of conductive traces of the touch panel stimulated simultaneously to provide the set of self capacitance measurements, wherein a second pattern of the touch nodes comprises a pair of the row conductive traces, one of the row pair being stimulated to drive the other of the row pair to transmit at least some of the set of mutual capacitance measurements, wherein a third pattern of the touch nodes comprises a pair of the column conductive traces, one of the column pair being stimulated to drive the other of the column pair to transmit at least others of the set of mutual capacitance measurements, and wherein the processor receives the sets of mutual and self capacitance measurements from the first, second, and third patterns of the nodes. Additionally or alternatively to one or more examples disclosed above, the set of touch nodes comprises: an array of electrodes, each electrode having shaved corners to provide a distance from another electrode. Additionally or alternatively to one or more examples disclosed above, a first pattern of the touch nodes comprises electrodes of the touch panel stimulated simultaneously to provide the set of self capacitance measurements, wherein a second pattern of the touch nodes comprises a first of the electrodes being a drive electrode, a second of the electrodes being a ground electrode, a third of the electrodes being a sense electrode, and a fourth of the electrodes being a ground electrode, the first electrode being stimulated to drive the third electrode to transmit the set of mutual capacitance measurements, and wherein the processor receives the sets of mutual and self capacitance measurements from the first and second patterns of the nodes. Additionally or alternatively to one or more examples disclosed above, the first pattern of the touch nodes comprises a first electrode of the touch panel being a drive electrode, a second electrode being a ground electrode, a third electrode being a sense electrode, and a fourth electrode being a ground electrode, the first electrode being stimulated to provide the set of self capacitance measurements and to drive the third electrode to provide the set of mutual capacitance measurements simultaneously, and wherein the processor receives the sets of mutual and self capacitance measurements from the first pattern of the nodes. Additionally or alternatively to one or more examples disclosed above, the first pattern of the touch nodes comprises electrodes of the touch panel stimulated simultaneously to provide some of the set of self capacitance measurements, wherein a second pattern of the touch nodes comprises a first of the electrodes being a drive electrode, a second of the electrodes being a following electrode, a third of the electrodes being a ground electrode, and a fourth of the electrodes being a following electrode, the first electrode being stimulated to provide others of the set of self capacitance measurements, and wherein the processor receives the set of self capacitance measurements from the first and second patterns of the nodes. Additionally or alternatively to one or more examples disclosed above, the device comprising at least one of a mobile phone, a media player, or a portable computer.

Other examples of the disclosure are directed to a method for using mutual and self capacitance measurements at a touch panel, comprising: measuring a self capacitance and a mutual capacitance at touch nodes of the touch panel, the measurements indicative of an object proximate to the touch panel; determining a correction factor based on the self and mutual capacitance measurements; and calculating a touch signal, based on the correction factor, the touch signal corrected for at least one of a grounding condition of the object, water disposed on the touch panel, or noise introduced into the touch panel.

Other examples of the disclosure are directed to a touch panel comprising: multiple touch nodes capable of detecting an object proximate to the panel, at least one of the touch nodes for detecting a touch of the object in a first operation and for measuring at least one of a self capacitance or a mutual capacitance of the node in a second operation. Additionally or alternatively to one or more examples disclosed above, the multiple touch nodes comprise a row of conductive traces and a column of conductive traces, the row and column traces crossing to form the nodes, wherein the first operation detects a mutual capacitance touch signal, and wherein the second operation measures at least one of a self capacitance of the row and column traces, a mutual capacitance of a pair of the row traces, or a mutual capacitance of a pair of the column traces. Additionally or alternatively to one or more examples disclosed above, the multiple touch nodes comprise an array of electrodes, wherein the first operation detects a self capacitance touch signal, and wherein the second operation measures at least one of a self capacitance of the electrodes or a mutual capacitance of a pair of the electrodes.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method for measuring mutual and self capacitance at a touch panel comprising:
   measuring mutual and self capacitances at multiple touch node patterns in the touch panel;
   determining one or more correction factors, the value of each correction factor being a function of both the measured mutual and self capacitances; and
   calculating a touch signal based on applying the one or more correction factors to the measured mutual or self capacitances, the touch signal indicative of an object proximate to the touch panel.

2. The method of claim 1, wherein the touch panel has a row-column electrode configuration, the touch panel including multiple rows of conductive traces and multiple columns of conductive traces, the columns crossing the rows to form mutual capacitances therebetween.

3. The method of claim 1, wherein the touch signal comprises a mutual capacitance touch signal.

4. The method of claim 1, wherein the measuring comprises:
   simultaneously measuring a first self capacitance of row conductive traces and a second self capacitance of column conductive traces of the touch panel at a first node pattern;
   measuring a first mutual capacitance between a pair of the row conductive traces at a second node pattern; and
   measuring a second mutual capacitance between a pair of the column conductive traces at a third node pattern.

5. The method of claim 1, wherein the measuring comprises:
   simultaneously measuring a first self capacitance of row conductive traces and a second self capacitance of column conductive traces of the touch panel at a first node pattern; and
   simultaneously measuring a first mutual capacitance between a pair of the row conductive traces and a second mutual capacitance between a pair of the row and column conductive traces at a second node pattern.

6. The method of claim 1, wherein the calculating further comprises:
   calculating the touch signal corrected for at least one of the proximate object being poorly grounded, water on the touch panel, or noise introduced into the touch panel.

7. The method of claim 1, wherein the touch panel has a pixelated electrode configuration, the touch panel including an array of electrodes to form self capacitances between the electrodes and the object.

8. The method of claim 1, wherein the touch signal comprises a self capacitance touch signal.

9. The method of claim 1, wherein the measuring comprises:
measuring a self capacitance globally from electrodes of the touch panel at a first node pattern; and
measuring a mutual capacitance between a pair of the electrodes at a second node pattern.

10. The method of claim 1, wherein the measuring comprises:
simultaneously measuring a self capacitance locally from at least one of electrodes of the touch panel and a mutual capacitance between a pair of the electrodes at a first node pattern.

11. The method of claim 1, wherein the measuring comprises:
measuring a first self capacitance globally from electrodes of the touch panel at a first node pattern; and
measuring a second self capacitance locally from at least one of the electrodes at a second node pattern.

12. The method of claim 1,
wherein the correction factor is applied to the measured mutual or self capacitances to correct for one of a grounding condition of a proximate object, water disposed on the touch panel, or noise introduced into the touch panel.

13. The method of claim 12, wherein the determining comprises:
determining the correction factor based on at least one of a first measurement of a first self capacitance of row conductive traces in the touch panel, a second measurement of a second self capacitance of column conductive traces in the touch panel, a third measurement of a first mutual capacitance between pairs of the row conductive traces, a fourth measurement of a second mutual capacitance between pairs of the column conductive traces, or a fifth measurement of a third mutual capacitance between pairs of the row and column conductive traces.

14. The method of claim 12, wherein the determining comprises:
determining the correction factor based on at least one of a first measurement of a first self capacitance globally from electrodes of the touch panel, a second measurement of a second self capacitance locally from at least one of the electrodes, or a third measurement of a mutual capacitance between a pair of the electrodes.

15. A touch device comprising:
a touch panel having a set of touch nodes capable of measuring a mutual capacitance touch and a self capacitance touch; and
a processor capable of
receiving at least one set of mutual capacitance touch measurements and at least one set of self capacitance touch measurements taken from multiple patterns of the touch nodes,
determining one or more correction factors, the value of each correction factor being a function of both the at least one set of mutual capacitance touch measurements and the at least one set of self capacitance touch measurements; and
calculating a touch signal at the touch panel based on applying the one or more correction factors to at least one of the set of mutual capacitance touch measurements and the set of self capacitance touch measurements.

16. The device of claim 15, wherein the set of touch nodes comprises:
multiple rows of conductive traces, each row trace having alternate wide and narrow portions, the wide portions tapering at distal ends to couple to the narrow portions; and
multiple columns of conductive traces, each column trace having wide portions tapering at distal ends and bridges connecting the tapered distal ends of the wide portions,
wherein the rows and columns cross each other at the narrow portions of the row traces and the bridges of the column traces.

17. The device of claim 15, wherein a first pattern of the touch nodes comprises rows and columns of conductive traces of the touch panel stimulated simultaneously to provide the set of self capacitance measurements,
wherein a second pattern of the touch nodes comprises a pair of the row conductive traces, one of the row pair being stimulated to drive the other of the row pair to transmit at least some of the set of mutual capacitance measurements,
wherein a third pattern of the touch nodes comprises a pair of the column conductive traces, one of the column pair being stimulated to drive the other of the column pair to transmit at least others of the set of mutual capacitance measurements, and
wherein the processor receives the sets of mutual and self capacitance measurements from the first, second, and third patterns of the nodes.

18. The device of claim 15, wherein the set of touch nodes comprises:
an array of electrodes, each electrode having shaved corners to provide a distance from another electrode.

19. The device of claim 15, wherein a first pattern of the touch nodes comprises electrodes of the touch panel stimulated simultaneously to provide the set of self capacitance measurements,
wherein a second pattern of the touch nodes comprises a first of the electrodes being a drive electrode, a second of the electrodes being a ground electrode, a third of the electrodes being a sense electrode, and a fourth of the electrodes being a ground electrode, the first electrode being stimulated to drive the third electrode to transmit the set of mutual capacitance measurements, and
wherein the processor receives the sets of mutual and self capacitance measurements from the first and second patterns of the nodes.

20. The device of claim 15, wherein a first pattern of the touch nodes comprises a first electrode of the touch panel being a drive electrode, a second electrode being a ground electrode, a third electrode being a sense electrode, and a fourth electrode being a ground electrode, the first electrode being stimulated to provide the set of self capacitance measurements and to drive the third electrode to provide the set of mutual capacitance measurements simultaneously, and
wherein the processor receives the sets of mutual and self capacitance measurements from the first pattern of the nodes.

21. The device of claim 15, wherein a first pattern of the touch nodes comprises electrodes of the touch panel stimulated simultaneously to provide some of the set of self capacitance measurements,
wherein a second pattern of the touch nodes comprises a first of the electrodes being a drive electrode, a second of the electrodes, a third of the electrodes being a ground electrode, and a fourth of the electrodes, the first electrode, second electrode, and fourth electrode being stimulated with stimulation signals, the first electrode being sensed to provide others of the set of self capacitance measurements, and the second electrode and fourth electrode not being sensed, and wherein the processor receives the set of self capacitance measurements from the first and second patterns of the nodes.

22. The device of claim 15 comprising at least one of a mobile phone, a media player, or a portable computer.

23. A method for using mutual and self capacitance measurements at a touch panel, comprising:

measuring a self capacitance and a mutual capacitance at touch nodes of the touch panel, the measurements indicative of an object proximate to the touch panel;

determining one or more correction factors, the value of each correction factor being a function of both the self and mutual capacitance measurements; and calculating a touch signal based on applying the one or more correction factors to the self or mutual capacitance measurements, the touch signal corrected for at least one of a grounding condition of the object, water disposed on the touch panel, or noise introduced into the touch panel.

\* \* \* \* \*